US012715124B2

(12) United States Patent
Vaughn

(10) Patent No.: US 12,715,124 B2
(45) Date of Patent: Aug. 25, 2026

(54) BIOMECHANICAL OBJECT WEIGHT ESTIMATION SYSTEM

(71) Applicant: Intel Corporation, Santa Clara, CA (US)

(72) Inventor: Robert Lawson Vaughn, Portland, OR (US)

(73) Assignee: Intel Corporation, Santa Clara, CA (US)

(*) Notice: Subject to any disclaimer, the term of this patent is extended or adjusted under 35 U.S.C. 154(b) by 78 days.

(21) Appl. No.: 18/955,201

(22) Filed: Nov. 21, 2024

(65) Prior Publication Data

US 2026/0138272 A1 May 21, 2026

(51) Int. Cl.
*B25J 9/16* (2006.01)
*B62D 57/032* (2006.01)

(52) U.S. Cl.
CPC ........... *B25J 9/1638* (2013.01); *B25J 9/1653* (2013.01); *B25J 9/1697* (2013.01); *B62D 57/032* (2013.01)

(58) Field of Classification Search
CPC ...... B25J 9/1638; B25J 9/1653; B25J 9/1697; B62D 57/032
See application file for complete search history.

(56) References Cited

U.S. PATENT DOCUMENTS

2006/0142896 A1* 6/2006 Yokoyama ............. B25J 9/1612 700/245
2024/0085250 A1* 3/2024 Utsuki .................... G06F 3/011

OTHER PUBLICATIONS

Palinko O., et al., “Communicative Lifting Actions in Human-Humanoid Interaction”, Nov. 2014, IEEE, 2014 14th IEEE-RAS International Conference on Humanoid Robots (Humanoids), pp. 1116-1121 (Year: 2014).*

Sciutti A., et al., “Do humans need learning to read humanoid lifting actions?”, 2013, IEEE, 2013 The Third IEEE International Conference on Development and Learning and on Epigenetic Robotics (Year: 2013).*

Lastrico, Linda, “Towards the Estimation of Object Characteristics by Observing Human Manipulation”, [Online]. Retrieved from the Internet: https: i-rim.it wp-content uploads 2021 01 I-RIM_2020_paper_91.pdf, (2020), 2 pgs.

Sciutti, Alessandra, “Understanding Object Weight from Human and Humanoid Lifting Actions”, IEEE Transactions On Autonomous Mental Development vol. 6 Issue 2, (Mar. 20, 2014), 14 pgs.

* cited by examiner

*Primary Examiner* — Abby Lin
*Assistant Examiner* — Karston G. Evans
(74) *Attorney, Agent, or Firm* — Banner & Witcoff, Ltd.

(57) ABSTRACT

Various aspects of an object weight estimation system are described, to enable weight estimation of an object to be transferred from an object source (e.g., a human or an ambulatory robot) that holds the object using one or more arms. One technique includes: tracking an object to be transferred from the object source to a robot; identifying, from at least one image captured by the robot, a posture of the object source; identifying respective segments of the object source from the posture of the object source; determining an estimated weight of the object based on a center of gravity of the object source, as the center of gravity of the object source is calculated in real-time from a balance of the respective segments; and causing a responsive action with the robot, based on the estimated weight of the object.

20 Claims, 14 Drawing Sheets

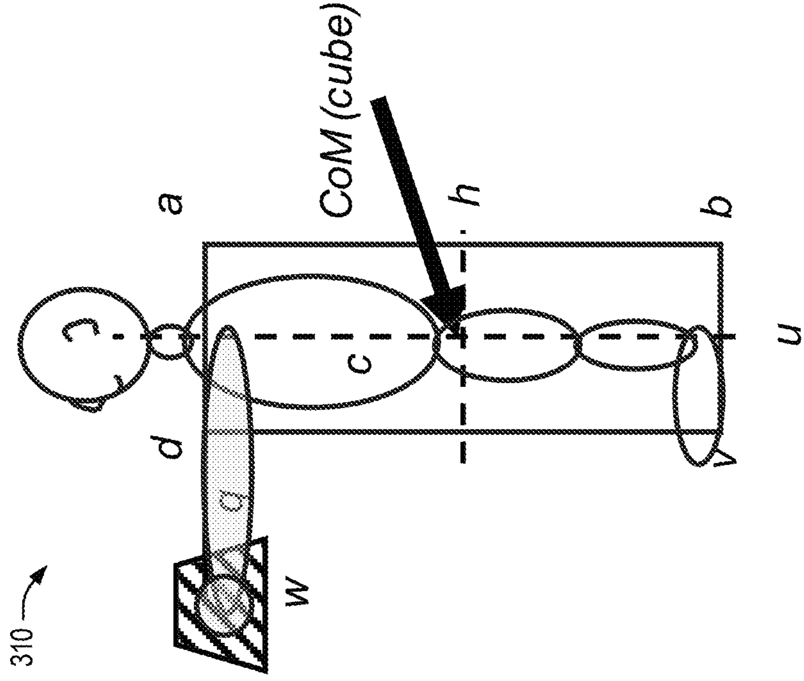
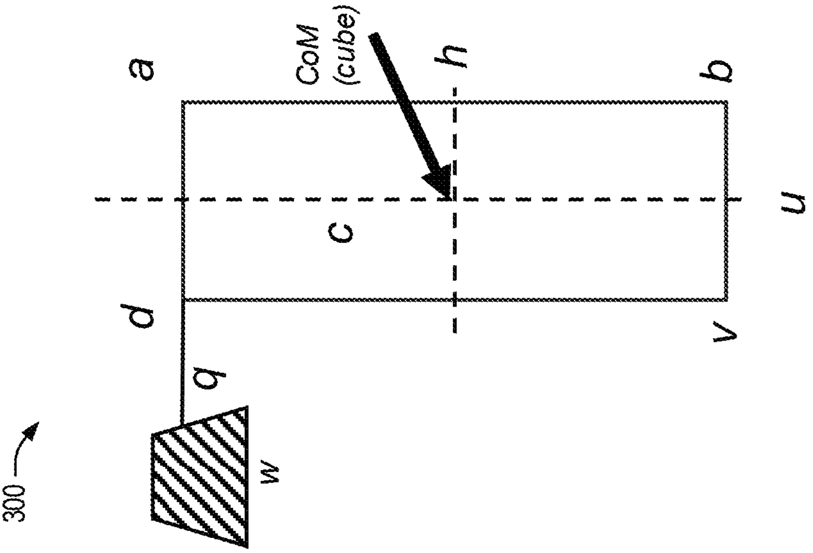
FIG. 3

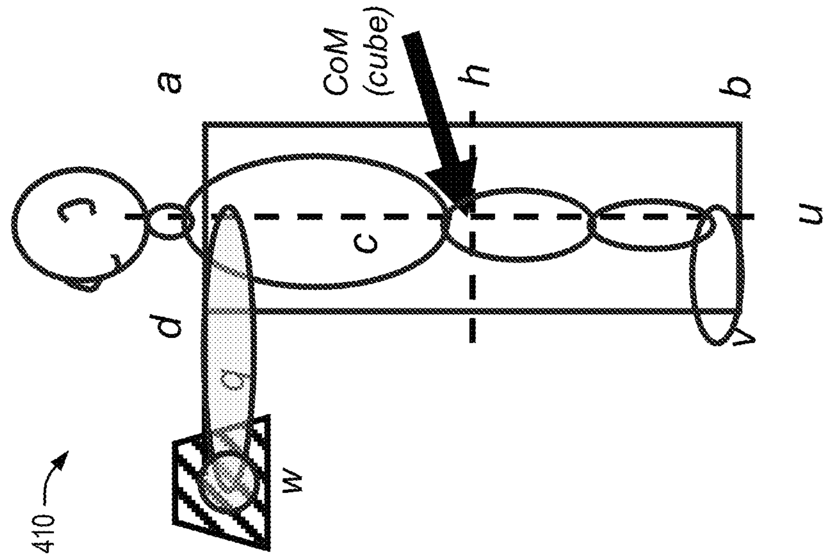
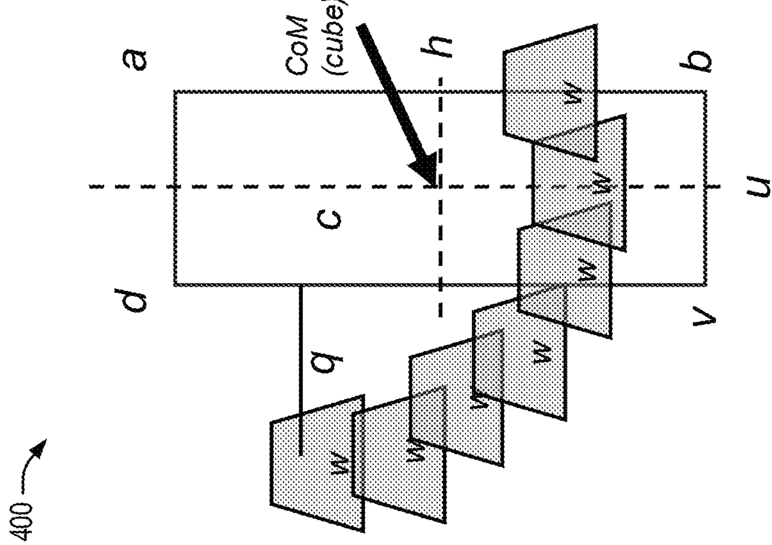
FIG. 4

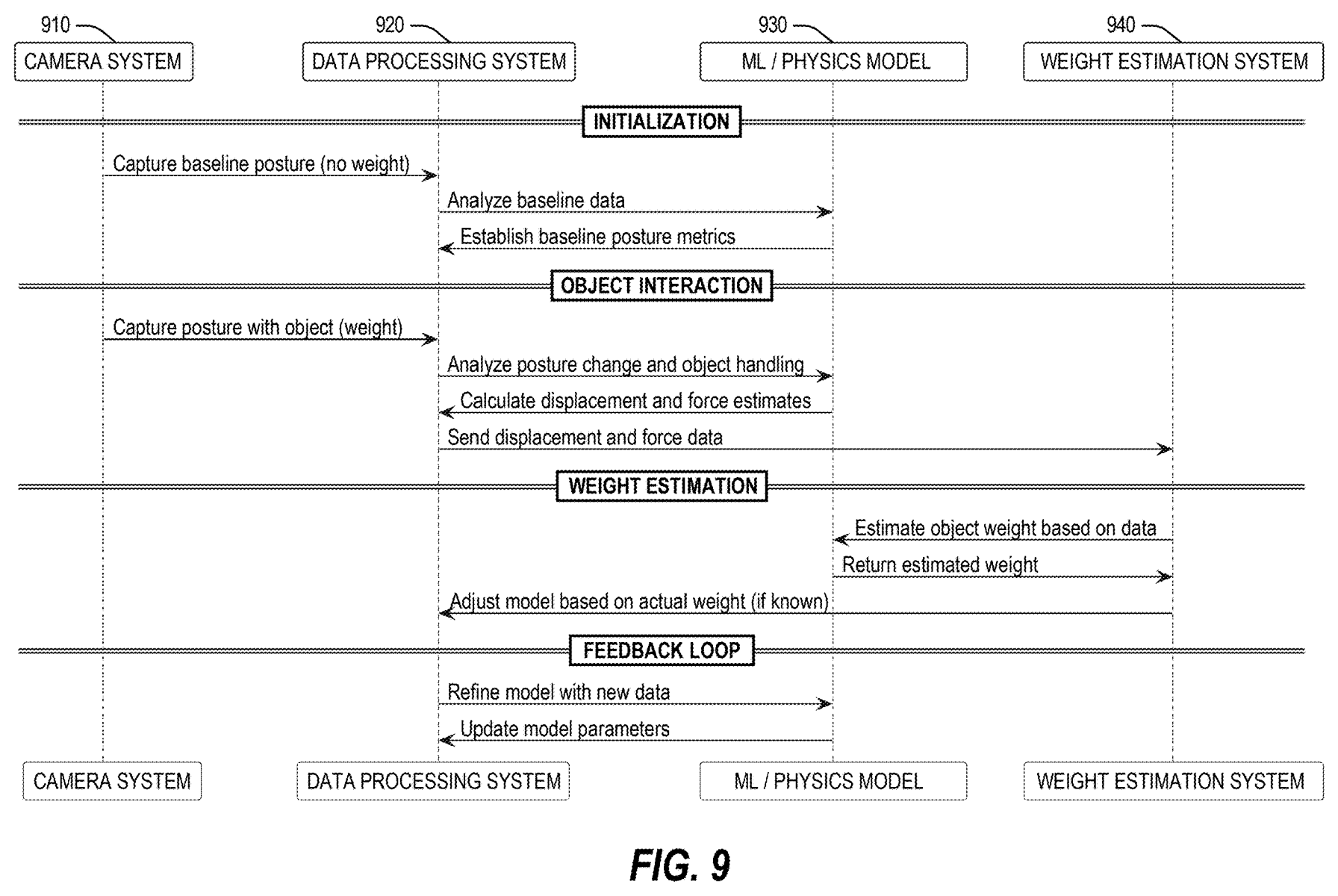

910 CAMERA SYSTEM
920 DATA PROCESSING SYSTEM
930 ML / PHYSICS MODEL
940 WEIGHT ESTIMATION SYSTEM

INITIALIZATION
Capture baseline posture (no weight)
Analyze baseline data
Establish baseline posture metrics OBJECT INTERACTION
Capture posture with object (weight)
Analyze posture change and object handling
Calculate displacement and force estimates
Send displacement and force data WEIGHT ESTIMATION
Estimate object weight based on data
Return estimated weight FEEDBACK LOOP
Adjust model based on actual weight (if known)
Refine model with new data
Update model parameters

CAMERA SYSTEM
DATA PROCESSING SYSTEM
ML / PHYSICS MODEL
WEIGHT ESTIMATION SYSTEM

*FIG. 9*

BIOMECHANICAL OBJECT WEIGHT ESTIMATION SYSTEM

BACKGROUND

Robots and other autonomous agents, also known as autonomous mobile robots (AMRs), may be programmed to perform complex real-world tasks. One type of use case expected for robots is the handling of materials by ambulatory or other multi-function robots, such as a humanoid-style or quadrupedal-style robot that is capable of moving and performing tasks using legs, arms, and other limb-like structures. Some forms of ambulatory robots mimic the way that animals or humans walk and handle objects. Thus, ambulatory robots may be useful in complex operational environments to assist other humans and machines.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

FIG. 3 depicts a model for identifying a tipping point of mass, according to an example.

FIG. 4 depicts a model for identifying a tipping point of mass with iterative evaluation, according to an example.

FIG. 9 depicts a workflow for using a weight estimation system, according to an example.

DETAILED DESCRIPTION

Figure 1:
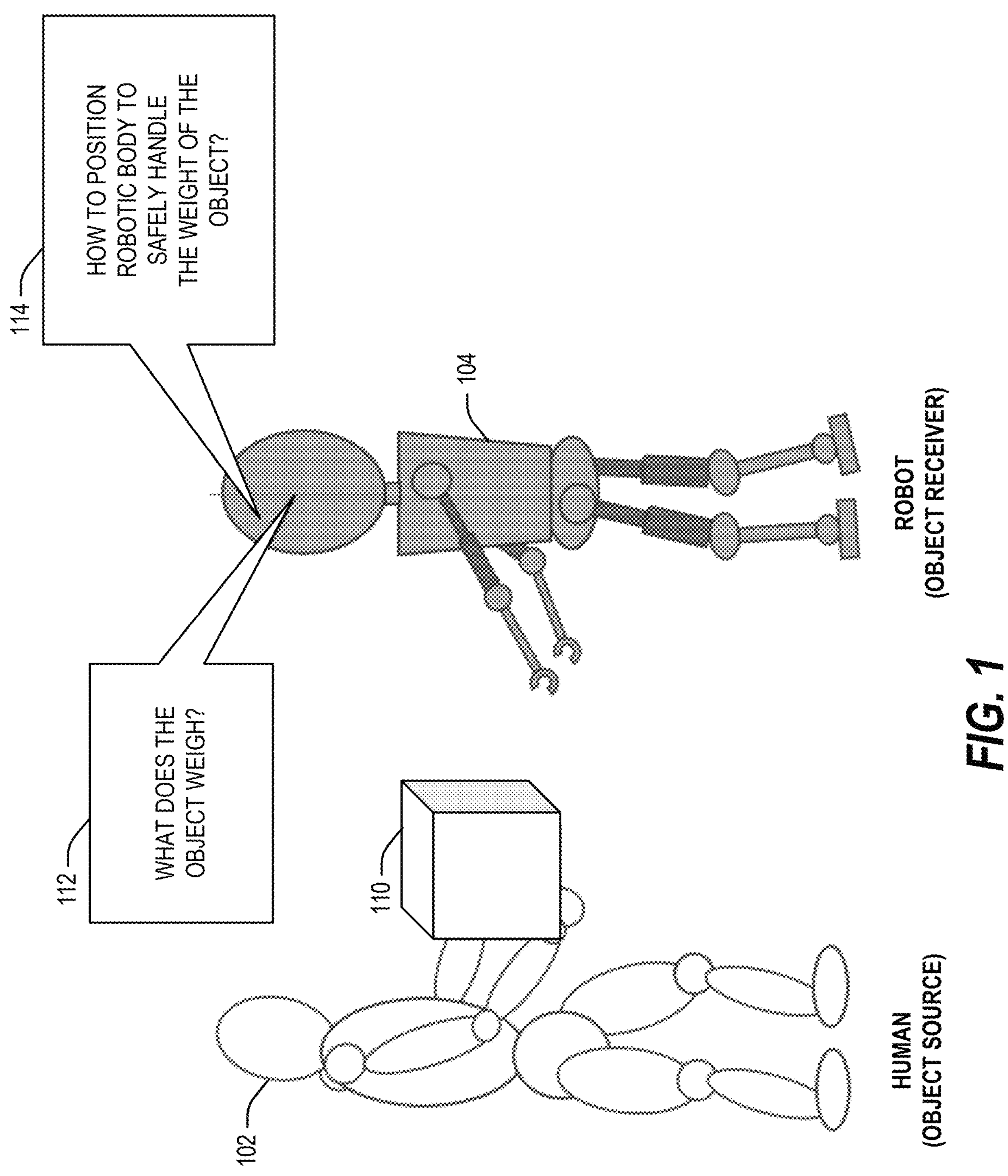
FIG. 1 illustrates an operational scenario of human-robot collaboration based on an object transfer, according to an example.

The following discusses improvements of sensing and response subsystems in robotic systems and deployments. Specifically, the following addresses the problem of an ambulatory robot (e.g., a humanoid-style robot) or other multi-function or mobile robot being able to visually estimate the maximum weight of an object that is provided to the ambulatory robot from a human (or another ambulatory robot).

Human-robot collaboration faces many challenges with the handoff of heavy objects, risking injury and inefficiency to robots and other humans due to inadequate load balancing and object handling support. By integrating weight estimation with the present techniques, robots can assist with heavy lifting and object transportation, improving safety and distributing burdens evenly between human and machines. Further, the present techniques integrate aspects of advanced computer vision, machine learning, and biomechanical analysis to infer the weight of objects based on observed human interactions, without the need for direct physical measurement.

The proposed techniques enable a robot to estimate the weight of objects by analyzing biomechanical data and physiological responses of an object source, extending the sensing capabilities of the robot beyond mere motion tracking and object identification. Some types of robotic arms equipped with force-torque sensors can measure the weight of objects they lift directly through sensor feedback but are not able to visually estimate the weight of objects handled by humans. The proposed techniques are able to additionally visually and physiologically infer this information without direct contact or the need for embedding sensors in the environment. Further, the proposed techniques are able to analyze movement data in conjunction with physiological indicators to estimate the weight of handled objects, which is beyond the scope of current technology from wearable sensors.

For example, consider a scenario where a worker at a construction site is partnering with an ambulatory robot. The human may be carrying an object (e.g., a concrete saw, power float, pneumatic drill, etc.) that the human wishes to hand off to the robot. In some scenarios, the robot can use machine learning or other vision methods to identify the object and estimate its approximate weight based on the type of object; but in other scenarios, the human may provide an unknown object or an unlabeled package or container. The robot may not be able to obtain information about the object's weight from the human worker, because construction sites and industrial sites are noisy, or the ambulatory robot may not include a data input interface to immediately receive information from the human worker. Likewise, even if some information was obtained about the weight of the object, the source of the object may be unable to rapidly provide a data communication that would provide a complete set of object information or sensor data. As a result, in many scenarios, a receiving robot may not be able to accurate estimate the weight of the object and adjust its position accordingly.

In some existing approaches, if the weight of an object is not known, then a receiving robot may choose to position its stance for handling an object of maximum weight. A receiving robot may also adjust its stance and ambulation based on handling weight determined via a zero moment point (ZMP) calculation and other internal sensor data, to maintain stability when the new object is handled. However, a significant problem is that robots—like humans—are not of equal size and capability, and an ambulatory robot may accept or attempt to accept an object that exceeds operating and safety limits in a particular environment. Thus, existing approaches for handling unknown objects are often reactive and limited and can lead to a variety of safety issues.

The following approaches provide useful estimates to provide a missing data point of estimated object weight and establish a proactive process in an ambulatory robot for handling objects. The information from the following approaches will allow the robot to properly position its stance, reject the object, or pursue some alternative (e.g., offer to help the worker carry the load, obtain an additional robot to assist, etc.).

The following specifically introduces a vision system that can accurately observe human body stance, lengths, and movements to create a geometric model of a human or object source. From the geometric model, a physics model described herein is used to estimate a Center of Gravity (CoG) (and, in some examples, a Center of Mass (COM)), from which an estimated weight of an object to be transferred can be derived. As will be understood, a CoM refers to a point where the mass of an object is considered to be concentrated, representing an average position of all the mass in the object after taking into account the distribution of mass throughout the object. A CoG refers to a point where the gravitational force can be considered to act, representing an average location (e.g., balance point) of the weight of an object.

Accordingly, the following approaches enable the observation of a maximum weight based on dimensionality rather than human musculature ability. When coupled with volumetric analysis and vector/acceleration observations, this provides a useful and practical observation system that increases the safety, utility, and operational reliability of ambulatory robots in a variety of human/robot collaborative activities.

FIG. 1 depicts an example operational scenario of human-robot collaboration involving an object transfer. Here, a human 102 (an object source or donor) provides an object 110 to an ambulatory robot 104 (an object receiver or recipient). An outline of the human 102 is depicted with simple geometric shapes but may be detected or perceived with a variety of vision and sensing technologies that are not illustrated. To successfully receive the object, the robot 104 may require information related to at least two aspects: a weight of the object 112 (e.g., as the robot 104 determines, what does the object weigh?); and a suitable position for handling the object 114 (e.g., as the robot 104 determines, how to position the robot's body to safely handle the weight of the object?). These two aspects can be determined based on an evaluation of the COM and/or CoG, with use of the techniques discussed herein.

Figure 2:
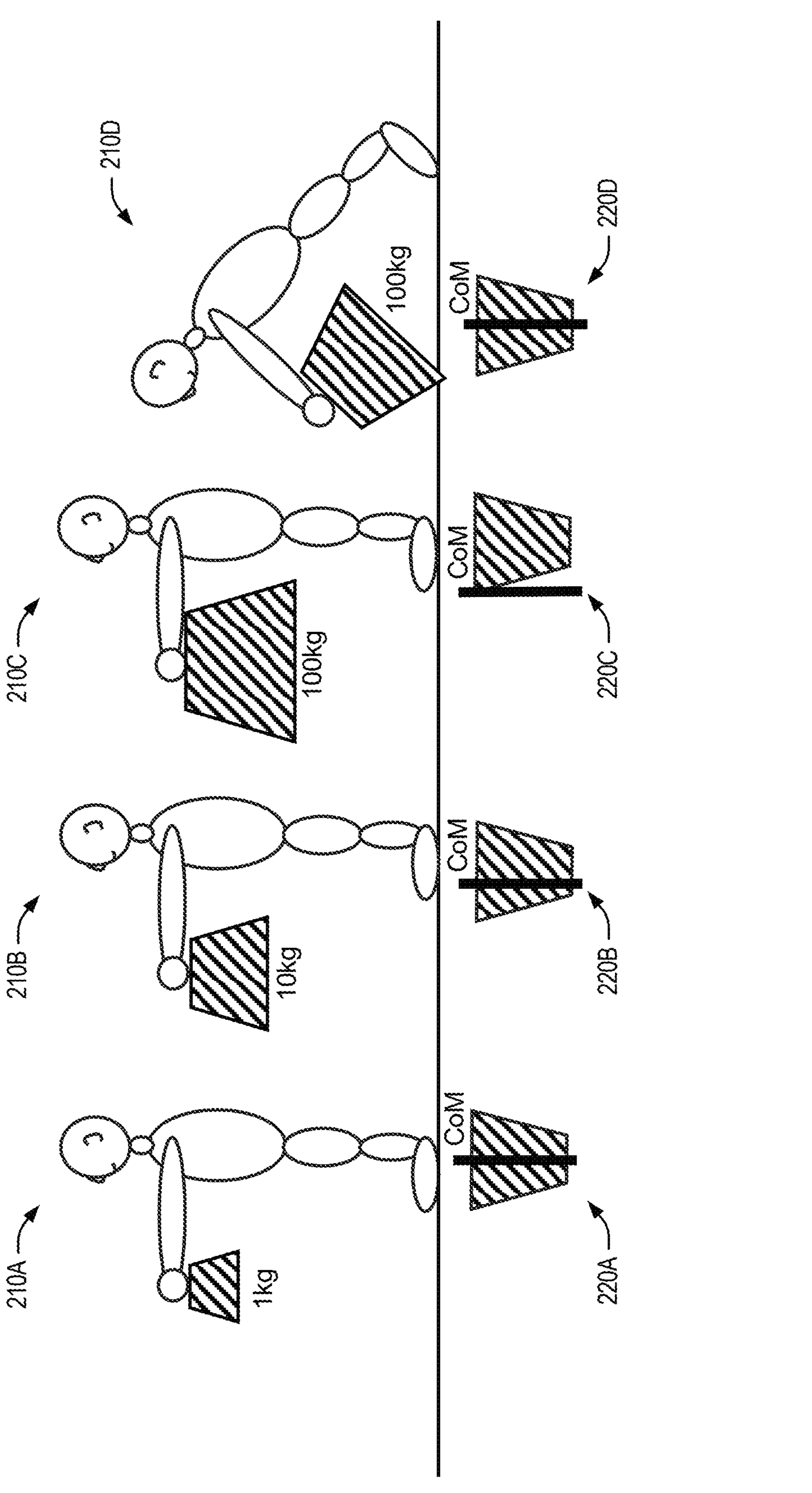
FIG. 2 illustrates a conceptual model for identifying a center of mass, according to an example.

FIG. 2 illustrates a conceptual model for identifying physics of mass, depicted with an example object source. In the depicted scenarios, the example subject may refer to a human source (e.g., human 102) or another ambulatory robot source that is holding an object of different weights using one or more arms. In scenario 210A, the subject holds a lightweight object of 1 kilogram at arms-length, causing the CoM 220A to be located very close to the CoM of the subject when the object is not being held. In scenario 210B, the subject holds a heavier object of 10 kilograms at arms-length, causing the CoM 220B to be moved slightly towards the object.

In scenario 210C, the subject holds an even heavier object of 100 kilograms at arms-length, and supposing that the human could temporarily hold this weight, the CoM 220C will move to a location between the human and the object. Scenario 210D shows that if the base (e.g., the feet) of the subject remain statically positioned, then the subject will tip over to a point where the CoM 220D is balanced between the object and the subject. Accordingly, as weight is added, the CoG (corresponding to the CoM) shifts from center of the object source's body towards the added weight.

Based on an estimation of the CoG or COM based on the stance and posture of the object source, an object weight can be estimated. This helps develop a strategy to determine a maximum weight that can be handled by an ambulatory robot for given body dimensions, stance, and position of object. Safe handling protocols can be established based on the calculated weight and a maximum object weight for the robot.

FIG. 3 depicts a model for identifying a tipping point of mass, which applies a moment balance equation to determine the tipping point. A tipping point can be determined based on the dimensions of a shape and the distribution of weight within that shape.

In the conceptual weight distribution scenario 300 depicted in FIG. 3, the following variables apply:

$$\begin{gathered} h \text{ is the height of the cube,} \\ a \text{ to } d \text{ is the length of the top side,} \\ v \text{ to } b \text{ is the length of the bottom side} \\ c \text{ is the weight of the cube} \\ u \text{ is distance from } a \text{ to } b \\ q \text{ is the distance to } w \\ w \text{ is a weight} \\ CoM(\text{cube}) \text{ is the center of mass of the cube} \end{gathered} \quad \text{EQUATION 1}$$

For example, consider a scenario where the cube is three dimensional with a base and top that have square dimensions. Consider a shape where: a to b=50 cm, v to b=50 cm, q=50 cm, h=200 cm, and w=5 kg. Here, by applying the moment balance equation, a calculation can determine the precise point at which additional weight causes the center of mass to shift beyond the base of support, resulting in a tip-over. This calculation involves assessing the shape's weight, the additional weight's location, and the distances involved, which, for uniform shapes like cubes, simplifies to balancing the moments around the pivot point.

In further examples, the tipping point of mass can be iteratively evaluated with the moment balance equation to determine the tipping point. FIG. 4 depicts a tipping point of mass, with iterative evaluation of movement of an object based on applying a moment balance equation. In the scenario of FIG. 4, the variables of EQUATION 1 apply as described above.

In this scenario, where an additional weight 'w' is applied to one side of a vertically standing cube, the tipping point varies with the horizontal distance 'q' from the cube's edge. For example, consider an algorithm that iteratively increases the value of 'q', simulating the weight 'w' moving further from the pivot point with each iteration. As 'q' increases, the moment arm lengthens, requiring less weight 'w' to reach the tipping point. This algorithm can calculate the maximum weight 'w' that the cube can support without tipping over for each increment of 'q'. This demonstrates how the stability of an object is inversely related to the distance at which force is applied from the pivot.

Figure 5B:
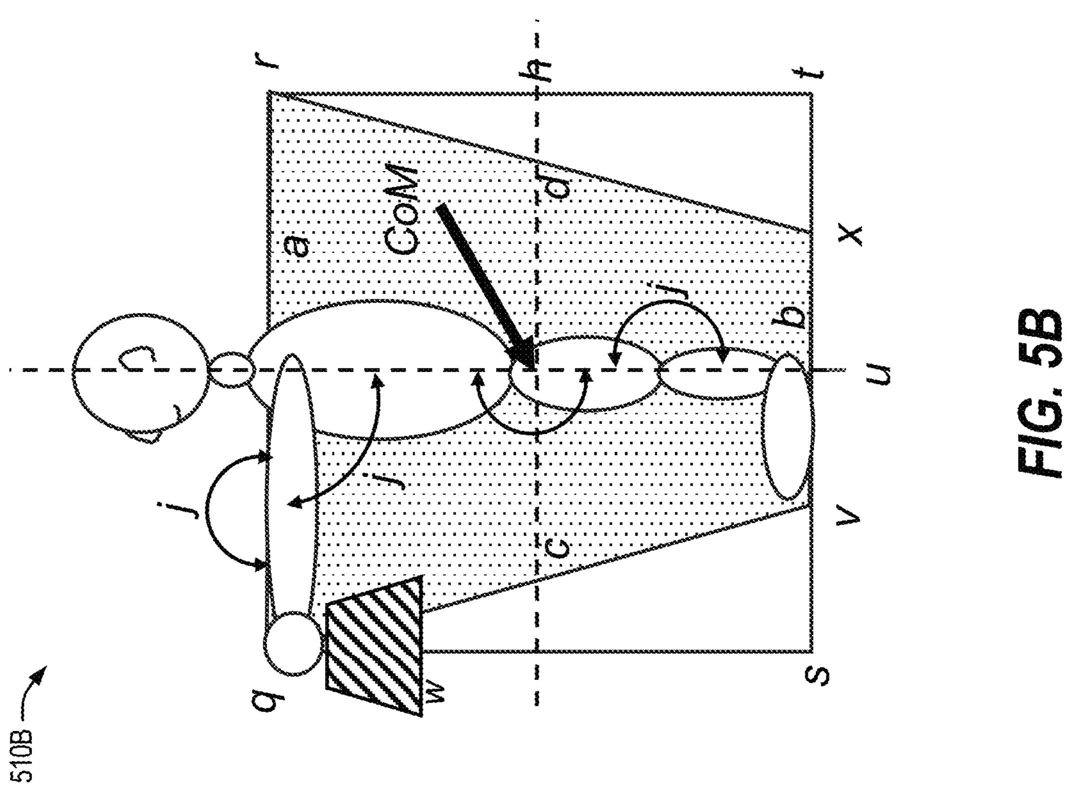
FIGS. 5A, 5B, and 5C depict aspects of a volumetric segmentation approach for identifying a center of mass, according to an example.
Figure 5A:
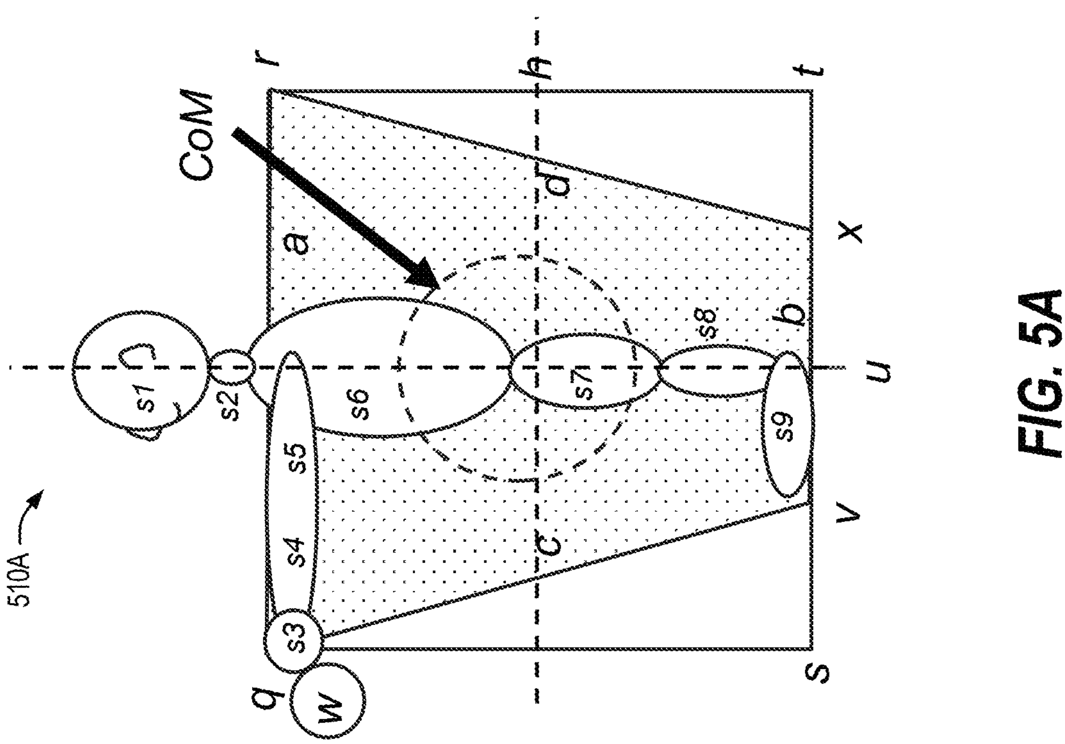
Figure 5C:
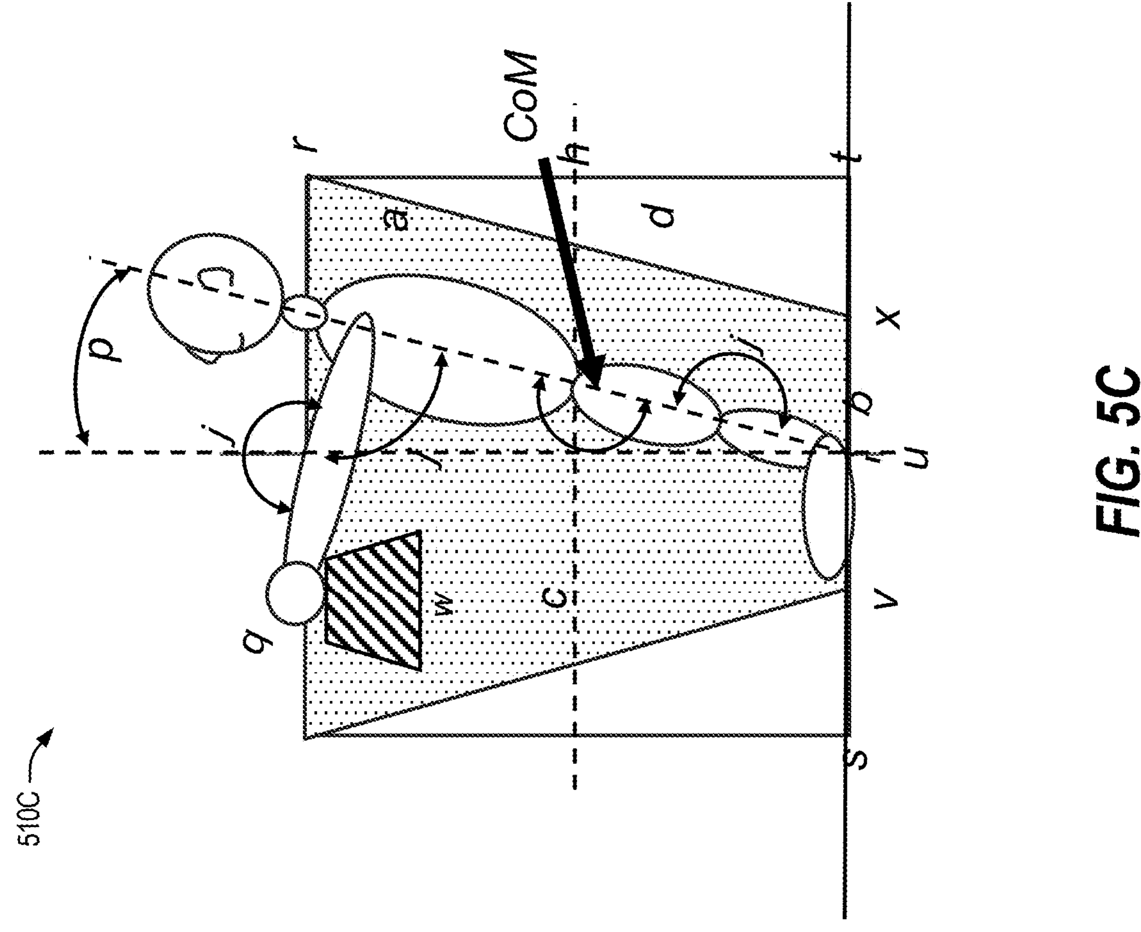

FIGS. 5A-5C depict a volumetric segmentation approach used for identifying and refining a position of the COM or a CoG. Refining the COM or CoG allows a more accurate determination of the maximum of "w". This approach can be performed using volumetric segmentation methods that segment different portions of the source's body into geometric shapes.

Specifically with volumetric segmentation methods, the human body can be divided into several portions or segments (like head, torso, arms, thighs, shanks, and feet), and the CoM or CoG of each segment is determined based on the mass and geometry of that segment. Data tables can be used to look-up average relative positions of the COM or CoG for each body segment. For example, by evaluating the mass of each segment and its center, the overall COM of the body can be calculated using the weighted average of the segment centers.

For example, consider the following example using the labeled segments depicted in FIGS. 5A to 5C.

EQUATION 2

$s1$: (head) – Mass: 4.5 kg, Location: Above the shoulders.

$s2$: (neck) – Mass: 1.5 kg, Location: Between head and torso.

$s3$, $s4$: (arms) – Mass: 3 kg each, Location: Sides of the torso.

$s5$: (torso) – Mass: 30 kg, Location: Centered in the middle.

$s6$: (waist) – Mass: 5 kg, Location: Between torso and legs.

$s7$, $s8$: (legs) – Mass: 10 kg each, Location: Below the waist.

$s9$: (feet) – Mass: 1.5 kg, Location: At the bottom of the trapezoid.

Based on the assumed segment masses and locations, the COM for the model 510A depicted in FIG. 5A is approximately at coordinates (5.0, 8.3) on the trapezoid diagram, with the origin (0,0) being at the bottom left corner 's'. The total mass of all the segments combined is 68.5 kg. The x-coordinate of the COM is at 5.0, which is centered horizontally within the trapezoid. The y-coordinate is at 8.3, which indicates that the COM is closer to the bottom of the trapezoid than the top, reflecting the concentration of mass in the lower half of the body (including the legs and lower torso).

A further evaluation can be used to determine a CoM trapezoid tipping point. FIG. 5B depicts a further model 510B that is capable of movement among different segments (e.g., among the legs and arms of the subject). To calculate the CoM tipping point, the following approach may be used. For any changes to the angles of joints "j", the maximum of "w" can be calculated based on foot positioning. Regardless of the strength of the human, the maximum of "w" can be determined for dimensions of "u:v:h:q" and "j" series. This can be represented by the following equation:

$$y_{cm} = \frac{h}{3} \cdot \frac{2a+b}{a+b} \qquad \text{EQUATION 3}$$

In Equation 3, h is the height of the trapezoid, a is the length of the top side, b is the length of the bottom side, u is distance from s to t, j is an angle of human joints, and w is a weight. Thus consider a scenario where: a=200 cm, b=50 cm, h=200 cm w=5 kg.

FIG. 5C depicts a further calculation of a trapezoid tipping point based on additional angles and leaning of the subject. Once the values of the trapezoid are observed and calculated, then the maximum weight of the object can be determined with high certainty. This maximum weight corresponds to "p" or the "angle of lean" in opposition of the weight. The value of "p" can also be calculated from an anterior view factoring in smaller trapezoids of human geometry deriving a dynamic CoG. Such consideration of the angle of lean refines the physics model to make it more accurate for use cases where portions of the subject are positioned in an off-center orientation.

Using the techniques discussed above, a geometry of the human source's body and stance, etc. can be observed. From these observations, the maximum weight of the carried object can be calculated. However, suppose there is a weak person who is only carrying a 5 kg object. If the weak person does not extend their arm with the object (a constrained trapezoid) then the available information could result in a weight estimation that the small 5 kg object is in the weight range of 30 kg to 250 kg. The robot should not need to position its stance for a maximum of a 250 kg weight. Rather, there is more observable data than may be initially considered, based on the evaluation of a CoG of individual segments of a larger body system. This can produce an evaluation of a "perceptual weight" of the object based on multiple segments and the adapted posture of the human.

Consider another scenario of a weak person carrying a small (e.g., 5 kg) object who is not moving his or her arms (providing data for the trapezoidal balance model). In this scenario, a design objective can be entered such that the robot will not infer a maximum weight. Instead, the physics model will moderate its maximum calculation of potential weight based on a perceptual weight. This can be determined based on specific characteristics of the object source, such as anterior shoulder asymmetry, lateral spinal deviation, and lateral pelvic tilt (etc.) as the increased weight in one hand requires a counterbalancing effect.

The result is a collection of offset trapezoidal models that enable us to refine the overall COM model based on changed CoG. Based on these observations, the calculation of weight can be refined using the same principles and formulas. Therefore, regardless of strength of the source (to a minimum range of weight), sufficient data can be observe to estimate the weight of some object and to calculate if the weight is within a maximum range.

Figures 6A, 6B:
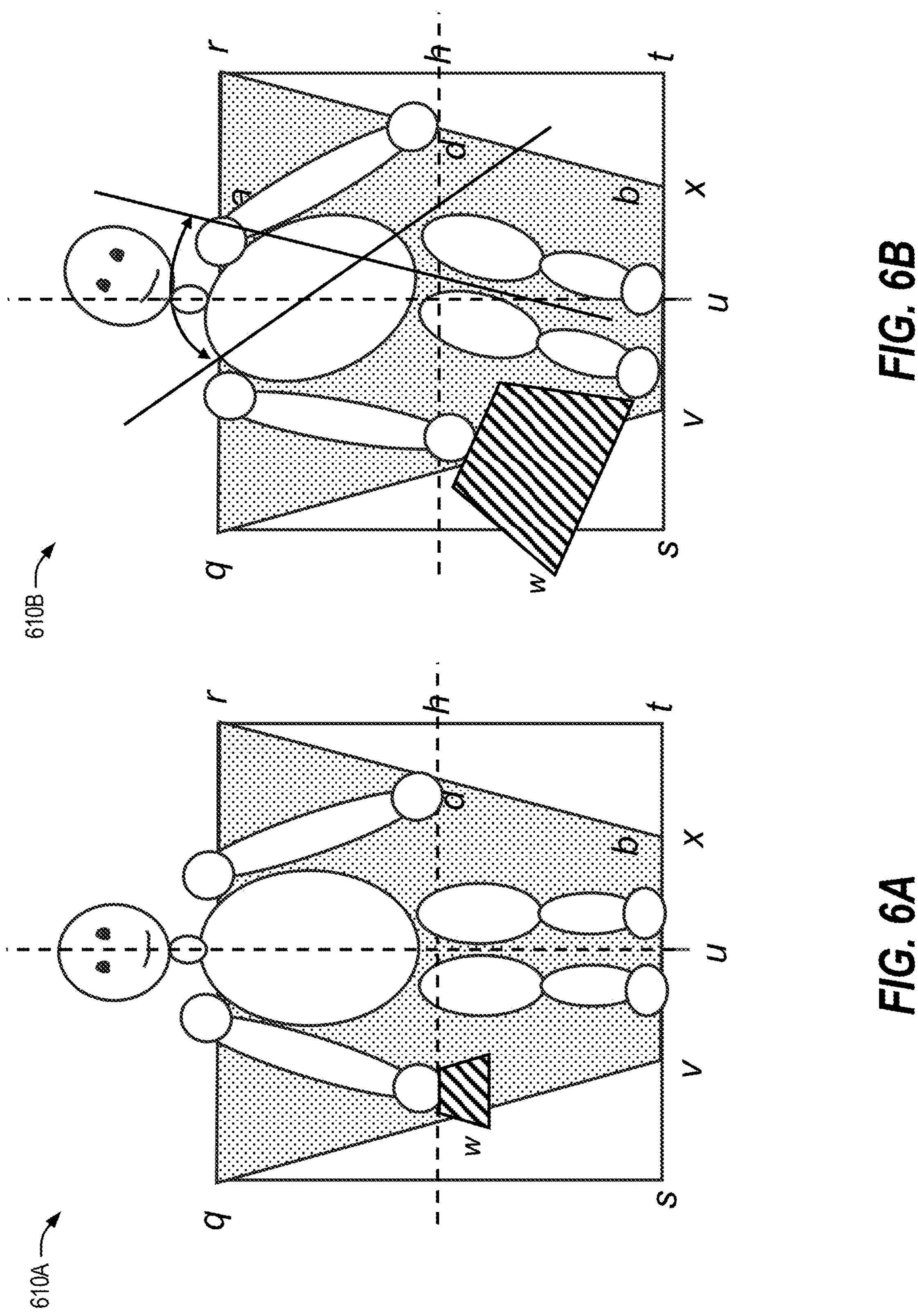
FIGS. 6A and 6B depict aspects of posture models for tracking a center of gravity, according to an example.

FIGS. 6A and 6B depict a comparison of posture models for tracking a center of gravity. In FIG. 6A, the model 610A depicts how a CoG may be calculated based on the position that is balanced relative to a straight posture of a human. In FIG. 6B, the model 610 depicts how a CoG is offset and aligned, based on the movement of the human's neck, torso, and legs based on the weight and mass of the object being carried.

Figure 7:
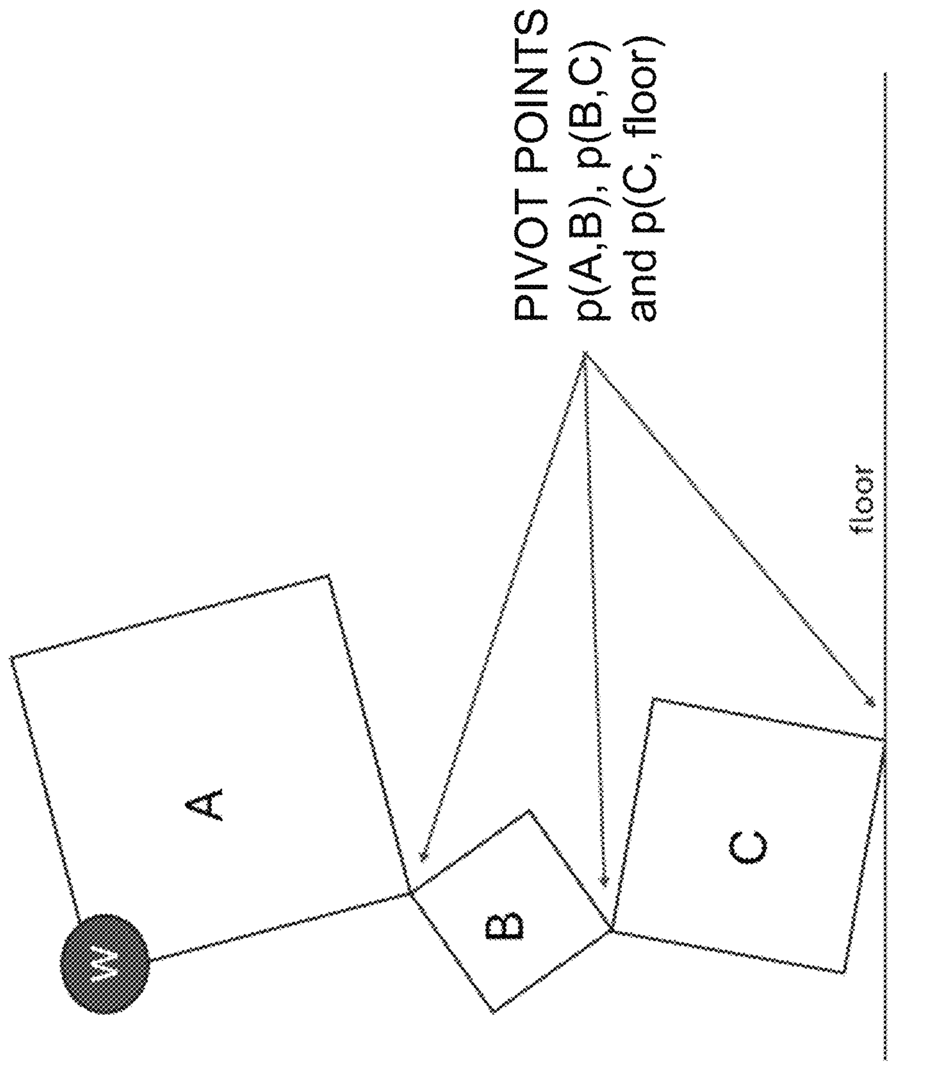
FIG. 7 depicts a conceptual model of object weights considered for evaluating a center of gravity, according to an example.

To detect complicated offset scenarios, various values for a CoG of multiple segments can be stacked and aligned within a model. FIG. 7 depicts a conceptual model of object weights considered for evaluating a CoG. Here, there are three cubes labeled "A", "B", and "C"; although the size and total weight differs in each cube, the weight is distributed uniformly throughout the shapes. A=10 kg, B=2.5 kg and C=5 kg. Further, suppose W is a weight of varying size at the top left corner of "A" that is not determined. For example, suppose A is 100 cm cubed, B is 25 cm cubed, and C is 50 cm cubed.

The trapezoids are stacked upon each other in a manner where the first trapezoid is balanced on the floor on a corner edge point of the first trapezoid. Then another trapezoid is stacked upon the first where one of its corner edges is balanced upon the first trapezoid highest corner edge point. And the third trapezoid is balanced upon the highest corner edge point of the second trapezoid. Trapezoid A, B, C will balance upon a CoG for A, B, C in a dynamic manner. Those angles of balance will produce a CoG across the collection of trapezoidal cubes. The individual CoG are considered for each trapezoid and how they interact to create a collective center of gravity for the entire structure. This can be determined using a formula that considers the weights of the trapezoids and their positions relative to each other.

For instance, suppose the CoG for each trapezoid is denoted as CG_A, CG_B, and CG_C for trapezoids A, B, and C, respectively. The overall center of gravity (CG_total) for the stack can be found by considering the moments created by each trapezoid about a reference point, which could be the point of contact with the ground for the first trapezoid. In this fashion, the high-level formula for the center of gravity of the entire stack can be expressed as:

$$CG\_total = (W\_A * CG\_A + W\_B * CG\_B + W\_C * CG\_C) / (W\_A + W\_B + W\_C) \quad \text{EQUATION 4}$$

Where: CG_total is the center of gravity of the entire stack; W_A, W_B, and W_C are the weights of trapezoids A, B, and C, respectively; and CG_A, CG_B, and CG_C are the positions of the centers of gravity of trapezoids A, B, and C, respectively, measured from a common reference point. Each CG_A, CG_B, and CG_C will be a vector quantity with x, y, and z components, depending on the orientation of the trapezoids and the point of balance. This formula assumes that the trapezoids are balanced in such a way that the moments around the base are equal to zero, which is a requirement for static equilibrium.

The stacked trapezoidal cubes are representable of human body part shapes, meaning that separate shapes can be observed collectively and a center of balance (and thus, an overall CoG for the object source) can be calculated from the shapes. The sum of the balance points then can be used to determine insight into the weight—at the end of the trapezoids—of objects influencing balance. Accordingly, based on the balance points, a weight attached to any of the trapezoid can be estimated.

To address a scenario of a weak person struggling to carry a lightweight object, consider that the robot need not always position itself for a maximum weight when it is known that the person is simply carrying some small known object (like a bottle of water). The robot may make volumetric observations of the object to coincide with the estimated weight. Further calculations can be performed by estimating weight on the physics of the geometrically observed human and moderating the maximum weight by the maximum volumetric weight of an observed object. Further, that calculation can be moderated again by evaluation of the velocity and acceleration of the object when being handled by a human.

Figure 8:
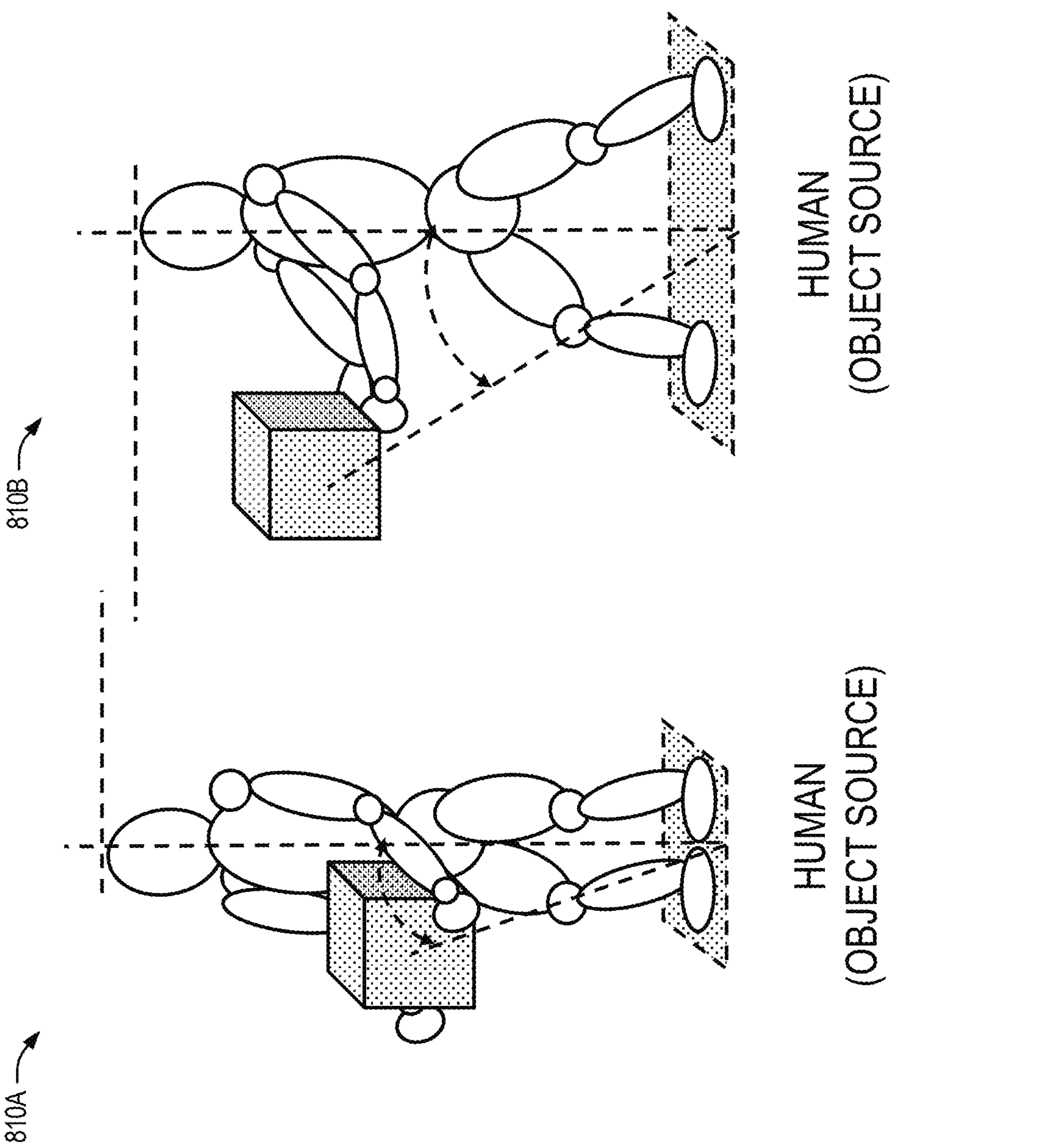
FIG. 8 depicts human posture occurring at a first and second time, to be analyzed by a weight estimation system, according to an example.

FIG. 8 depicts a first example posture 810A of a human source at a first time, which transitions into a second example posture 810B at a second time. The sequence of posture and the extension of the human's CoG shows how a human will adapt to handle an object with significant mass—even by a human who possesses above average strength and dexterity. Accordingly, based on the changed posture of the human, a robot can make anterior, posterior or lateral observations and construct a physics model of the potential maximum weight. The robot can make these maximum weight estimations to accompany the volumetric observations of the object and leveraged velocity and acceleration qualities of the object.

Further, in normal human interactions the act of "handing something over" often involves a first person raising the object to hand it over to the second person. Therefore, while an object source may not be always holding the object out in front of their body, the act of handing over an object typically involves movement that results in angular or geometric information and other information to support the model analysis.

As will be understood, many of the observable data points related to CoG, COM, and other properties may be observed using machine vision. In various examples, such machine vision properties can be obtained from a camera system of the ambulatory robot that is capable to observe a multitude of data points of the human source and its interaction with the object. The following are examples of some of the data points that can be used in the preceding calculations:

Height of human
Height of object
Base distance (of feet)
Object distance from vertical human center
Center of Mass
Center of Gravity
Incremental COM or CoG with motion
Hand position
Object volumetric properties This is a non-limiting list, and may be expanded based on the type of data model to consider additional or different data points.

Accordingly, the consideration of these properties in weight estimation techniques—combined with an analysis that divides the object into sections and considers their volumes and densities (sectional volumetric mass analysis) —can be used to calculate the maximum weight that a human can hold before reaching a tipping point. Quantitative physics can predict the actual weight a human can hold up to the calculated upper limit with a given body dimensions and stance. However, it cannot predict the exact weight that a particular individual can hold due to the variability of human strength, endurance, and stability, which also depend on factors like muscle fatigue, grip strength, and posture. However, adding a dynamic stability perspective to the weight estimation (e.g., via ZMP), enhances available data for the functions of safety and functionality of human-robot interactions.

Further integration of the present techniques for biomechanical object weight estimation employs an integration of computer vision, machine learning, and biomechanical analysis to estimate object weights during human interaction. By analyzing changes in human posture and movements captured through video, alongside physiological indicators, the system predicts the weight of objects being handled. This approach enables dynamic and non-invasive weight estimation, enhancing the capabilities of automated systems and robots in environments requiring interaction with humans and objects. In human-robot interaction, especially in collaborative robotics (cobots), determining the maximum safe weight is crucial to prevent injury to the human and avoid overloading the robot. The upper limit of weight handling is important for designing safety protocols and robotic systems that can interact safely and effectively with humans. The present approaches can be used when considering visual observation-derived data from humans, with moment balance formulas and sectional body mass analysis, to accurately calculate the maximum weight of an object being carried by a human.

FIG. 9 depicts an example workflow for using a weight estimation system. This workflow demonstrates the intricate design and operational flow of an overall system, highlighting a comprehensive approach to non-invasive weight estimation through the integration of advanced technologies and methodologies. By continuously refining its predictive capabilities based on real-world data and feedback, the weight estimation system aims to advance the field of human-robot interaction, providing a solution for automated systems and robots to accurately interpret and respond to human physical activities. However, it will be understood that variations to the following workflow operations may be provided.

A weight estimation system 940 is used to produce an estimated weight of an object being provided from a source (such as a human or another ambulatory robot). In addition to the use of the equations and analysis discussed above, the weight estimation system 940 may incorporate modeling such as a biomechanical model. A biomechanical model applies principles of human anatomy and physics to the processed data, enabling the system to estimate the forces and torques exerted by the user during object handling. This model considers the mechanics of limb movements, leveraging observed data on arm acceleration, posture adjustments, and counterbalance actions to quantify the effort involved in lifting and holding objects.

A camera system 910 (e.g., a computer vision subsystem) can include high-resolution cameras to capture detailed video footage of human-object interactions. The camera system 910 employs pose estimation algorithms to track and analyze the movement of key body points (shoulders, elbows, wrists) in real-time, facilitating a precise 3D spatial understanding of how objects are manipulated. The camera system (or a related tracking system) distinguishes between the human subject and the object, tracking the object's movement in relation to the person's body.

A data processing system 920 is used to provide data synthesis, where input from both the computer vision system (and other sensors) is processed and prepared for further analysis. It involves steps such as noise filtering, data normalization, and feature extraction, focusing on aspects like displacement, acceleration, and physiological signals that collectively offer a comprehensive dataset for modeling the interaction.

The machine learning or physics model 930 can be used to predict the weight of the object being interacted with. This predictive model is continuously refined through training on datasets of known object weights, employing advanced algorithms to learn and adapt to the complex relationship between observed human actions/physiological responses and the actual weight of objects. For example, when an object is previously labeled or otherwise known then that becomes part of the training dataset.

Additional sensors such as physiological sensors can be used for complementing the visual data. For example, physiological sensors provide insights into the internal state of the subject handling the object. These sensors may be designed to detect changes in blood pressure and other physiological indicators of exertion, offering a deeper layer of analysis that goes beyond mere physical movements to include the body's internal response to weight handling.

In further examples, a user interface and feedback system can allow users to interact with the system, providing a mechanism for inputting known weights and receiving feedback on weight estimates. This interface can assist with a system's learning and calibration process, enabling adjustments based on actual usage and feedback to enhance the accuracy and reliability of weight predictions.

The workflow in FIG. 9 also illustrates aspects of feedback and continuous learning using a feedback loop. When possible, the system collects feedback, such as the actual weight of the object if it is eventually scanned or inputted manually. This feedback is used to continuously train the machine learning or physics model 930, to refine the model's understanding of visual cues and improve the interpretation of qualitative data.

Accordingly, this architecture enables a robust and adaptable system capable of estimating object weights in real-time, enhancing the interaction between humans and automated systems or robots. By combining detailed biomechanical analysis with advanced data processing and machine learning, the system offers a solution to the challenge of non-invasive weight estimation in dynamic environments.

Figure 10:
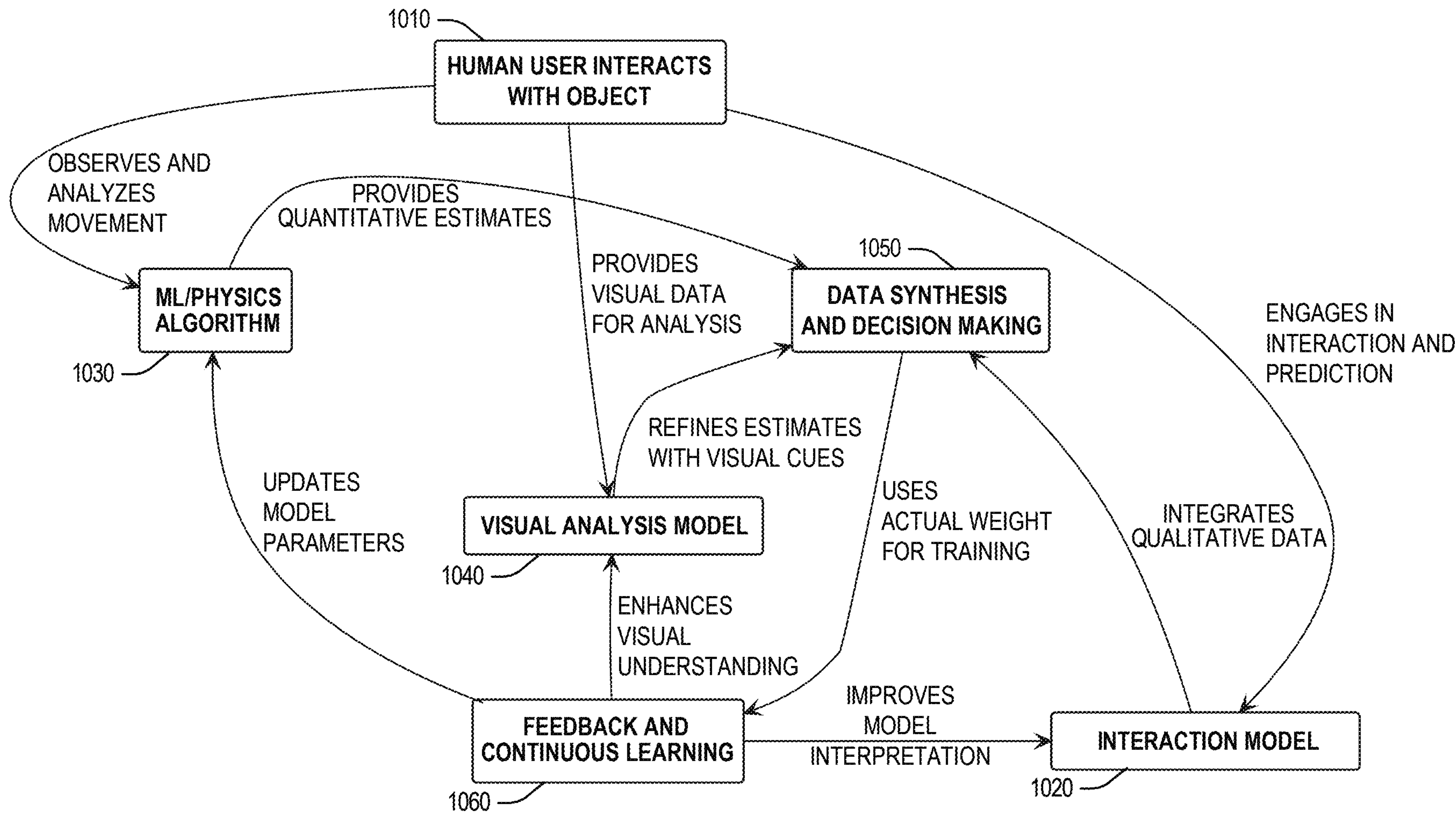
FIG. 10 illustrates a sequence flow diagram of processing operations used with a weight estimation system, according to an example.

FIG. 10 depicts a sequence flow diagram of example operations involved with a weight estimation system 940 using respective models, algorithms, and engine. Here, this diagram shows how a human user interaction 1010 is processed by a visual analysis model 1040 (e.g., integrated in the camera system 910) to identify movement of the human such as based on segmentation and tracking approaches discussed above. The information from the human user interaction 1010 is also provided to a machine learning or physics algorithm 1030 (e.g., implemented in the machine learning or physics model 930) that observes and analyzes the movement to determine estimates of object weights, based on the approaches discussed above. The human user interaction 1010 may also be analyzed by an interaction model 1020, such as an artificial intelligence model that predicts outcomes and supplies missing data.

The estimates of object weights are provided to a data synthesis and decision making engine 1050, which also receives other qualitative information from the interaction model 1020 and estimates from the visual analysis model 1040. The results of the data synthesis and decision making engine 1050 may be provided to a feedback and continuous learning engine 1060. The feedback and continuous learning engine 1060 can update model parameters, improve model interpretation and understanding, and provide other model or algorithm improvements.

By integrating the preceding approaches, the system can provide a robust and adaptable solution for estimating the weight of objects through human interaction. The process flow facilitates a comprehensive analysis of both quantitative and qualitative data, resulting in a more nuanced and accurate understanding of the objects' weights as handled by users.

Figure 11:
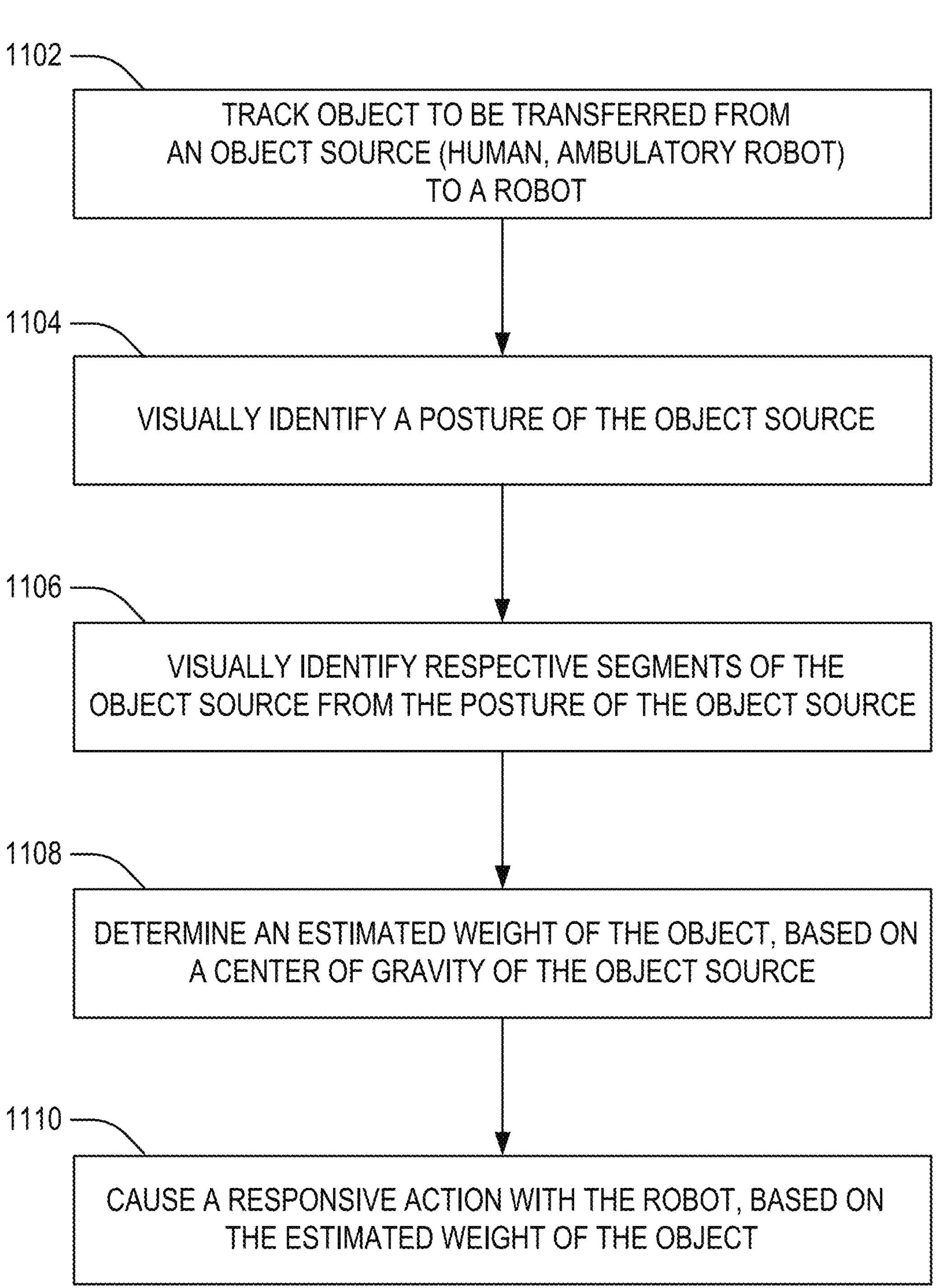
FIG. 11 illustrates a flowchart showing a technique for estimating weight of an object to be handled by a robot, according to an example.

FIG. 11 illustrates a flowchart showing an example technique 1100 for estimating weight of an object, such as to be handled by an ambulatory robot or mobile robot. The technique 1100 may be performed by an autonomous mobile robot (AMR), a fixed robot, a controller device or devices in an edge or datacenter network (e.g., an orchestrator, a server, a mobile device, an IoT device, or the like), or related equipment used in connection with the control or operation of a robot.

The technique 1100 includes an operation 1102 to track an object to be transferred from an object source (e.g., a human, another ambulatory robot) to a robot. As explained herein, this may include the object source holding the object using one or more arms, and/or making movements for transfer of the object.

The technique 1100 includes an operation 1104 to visually identify a posture of the object source. This may include analyzing at least one image captured by the robot, to identify the posture.

The technique 1100 includes an operation 1106 to visually identify respective segments of the object source from the posture of the object source. In some examples, the center of gravity for the object source can be determined based on positions of centers of gravity of the respective segments of the object source. For example, the center of gravity for the object source can be calculated from estimated weights determined for the respective segments, as the estimated weights are determined based on an orientation of the respective segments and points of balance of the respective segments.

In an example, the technique 1100 may include an operation 1108 to calculate or determine an estimated weight of the object, based on a center of gravity of the object source. In an example, the center of gravity of the object source is calculated from a balance of the respective segments (e.g., as discussed with reference to FIG. 7 above). In further examples, the estimated weight of the object is further determined based on visual analysis of the object (e.g., visual analysis of the object is produced from a trained model, such as with a trained model that is refined using feedback from weight estimations and weight sensing). In further examples, the estimated weight of the object is further calculated or determined based on an angle of lean of the object source when holding the object, such as when the angle of lean occurs in opposition to the estimated weight of the object source. In further examples, the estimated weight of the object is further calculated or determined based on a center of mass of the object source when holding the object.

The technique 1100 includes an operation 1110 to perform (e.g., cause or directly control) a responsive action with the robot, based on the estimated weight of the object. This may also include generating or transmitting signals to a control system, actuator, or command processing component of the robot. In an example, the responsive action with the robot includes a command to change a posture of the robot to handle the estimated weight of the object, such as using one or more arms or legs of an ambulatory robot. In another example, the responsive action with the robot includes a command to reject a transfer of the object, based on the estimated weight of the object exceeding a maximum weight.

Figure 12A:
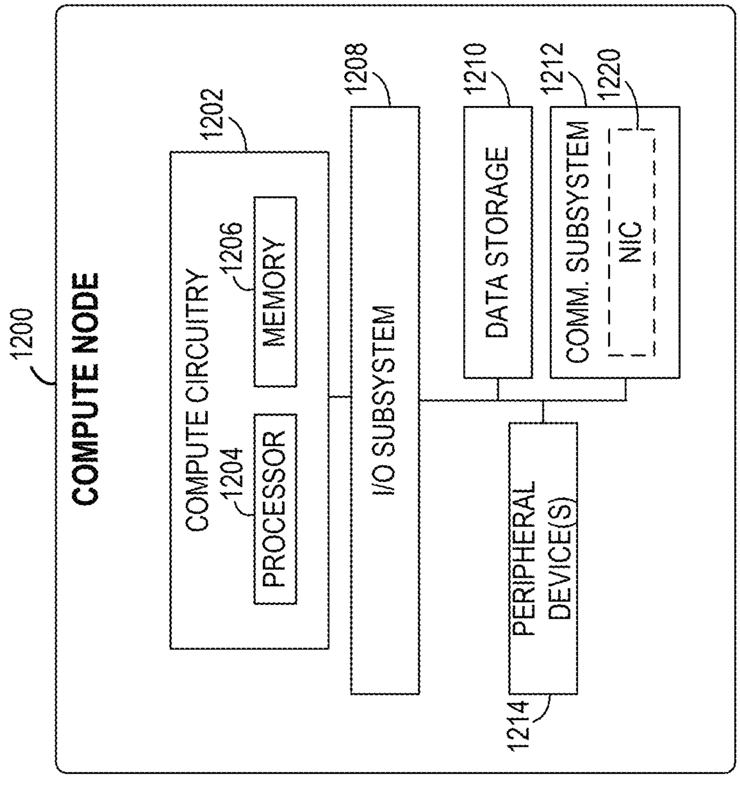
FIG. 12A provides an overview of example components deployed at a compute node.
Figure 12B:
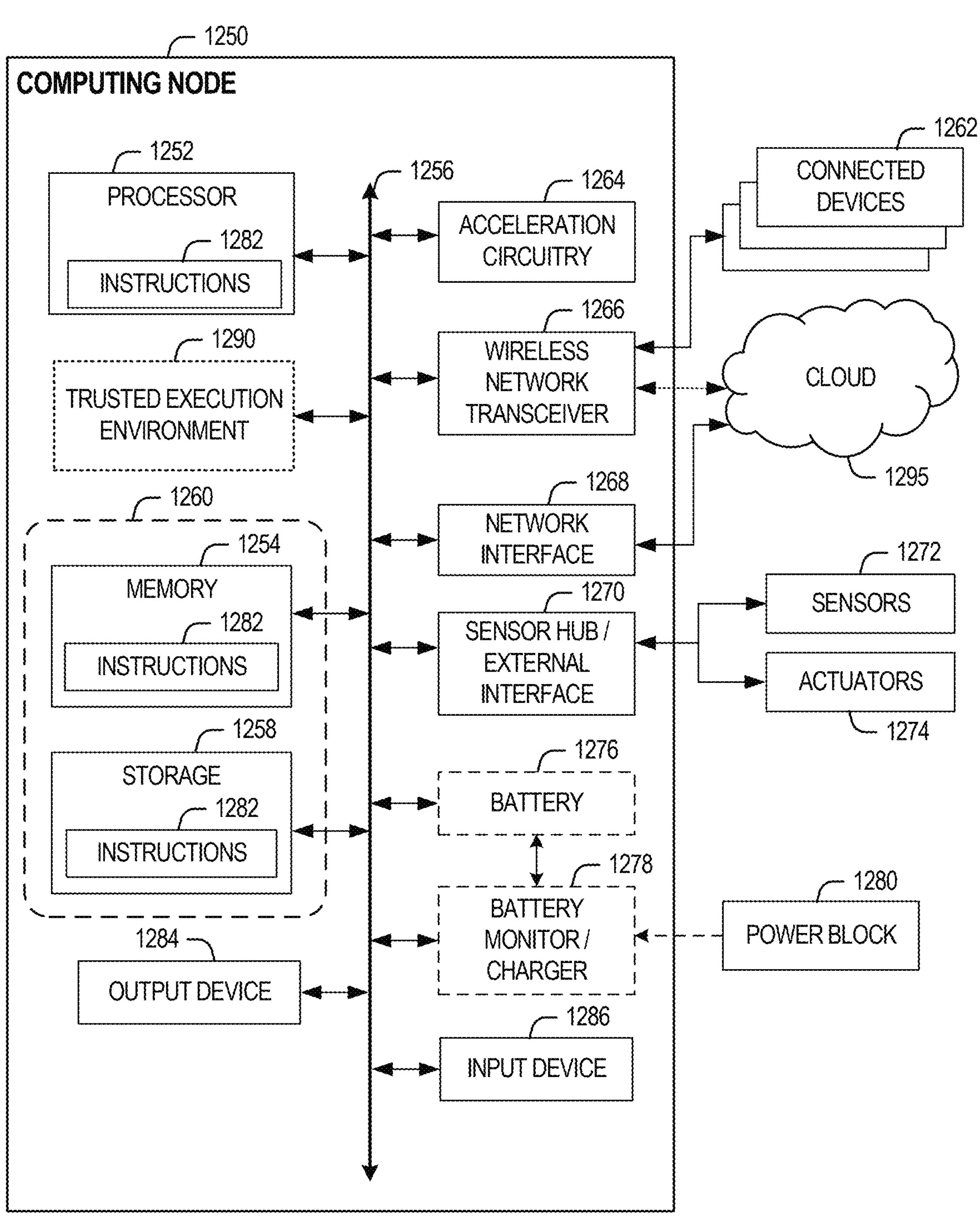
FIG. 12B provides a further overview of example components within a computing device.

In further examples, any of the computing nodes or devices used to implement these techniques may be implemented based on the components depicted in FIGS. 12A and 12B. Respective compute nodes may be embodied as a type of device, appliance, computer, or other "thing" capable of communicating with other compute, networking, or endpoint components. For example, a compute device may be embodied as or within a robot, a robot control system, a personal computer, server, a mobile computing device, a smart appliance, an in-vehicle compute system (e.g., a navigation system), a self-contained device having an outer case, shell, etc., or other device or system capable of performing the described functions.

In the simplified example depicted in FIG. 12A, a compute node 1200 includes a compute engine (also referred to herein as "compute circuitry") 1202, an input/output (I/O) subsystem 1208, data storage device 1210, a communication circuitry 1212 subsystem, and, optionally, one or more peripheral devices 1214. In other examples, respective compute devices may include other or additional components, such as those typically found in a computer (e.g., a display, peripheral devices, etc.). Additionally, in some examples, one or more of the illustrative components may be incorporated in, or otherwise form a portion of, another component.

The compute node 1200 may be embodied as any type of engine, device, or collection of devices capable of performing various compute functions. In some examples, the compute node 1200 may be embodied as a single device such as an integrated circuit, an embedded system, a field-programmable gate array (FPGA), a system-on-a-chip (SOC), or other integrated system or device. In the illustrative example, the compute node 1200 includes or is embodied as a processor 1204 and a memory 1206. The processor 1204 may be embodied as any type of processor capable of performing the functions described herein (e.g., executing an application). For example, the processor 1204 may be embodied as a multi-core processor(s), a microcontroller, a processing unit, a specialized or special purpose processing unit, or other processor or processing/controlling circuit.

In some examples, the processor 1204 may be embodied as, include, or be coupled to an FPGA, an application specific integrated circuit (ASIC), reconfigurable hardware or hardware circuitry, or other specialized hardware to facilitate performance of the functions described herein. Also in some examples, the processor 1204 may be embodied as a specialized x-processing unit (xPU) also known as a data processing unit (DPU), infrastructure processing unit (IPU), or network processing unit (NPU). Such an xPU may be embodied as a standalone circuit or circuit package, integrated within an SOC, or integrated with networking circuitry (e.g., in a SmartNIC, or enhanced SmartNIC), acceleration circuitry, storage devices, or AI hardware (e.g., GPUs or programmed FPGAs). Such an xPU may be designed to receive programming to process one or more data streams and perform specific tasks and actions for the data streams (such as hosting microservices, performing service management or orchestration, organizing or managing server or data center hardware, managing service meshes, or collecting and distributing telemetry), outside of the CPU or general purpose processing hardware. However, it will be understood that a xPU, a SOC, a CPU, and other variations of the processor 1204 may work in coordination with each other to execute many types of operations and instructions within and on behalf of the compute node 1200.

The memory 1206 may be embodied as any type of volatile (e.g., dynamic random access memory (DRAM), etc.) or non-volatile memory or data storage capable of performing the functions described herein. Volatile memory may be a storage medium that requires power to maintain the state of data stored by the medium. Non-limiting examples of volatile memory may include various types of random access memory (RAM), such as DRAM or static random access memory (SRAM). One particular type of DRAM that may be used in a memory module is synchronous dynamic random access memory (SDRAM).

In an example, the memory device is a block addressable memory device, such as those based on NAND or NOR technologies. A memory device may also include a three dimensional crosspoint memory device (e.g., Intel® 3D XPoint™ memory), or other byte addressable write-in-place nonvolatile memory devices. The memory device may refer to the die itself and/or to a packaged memory product. In some examples, 3D crosspoint memory (e.g., Intel® 3D XPoint™ memory) may comprise a transistor-less stackable cross point architecture in which memory cells sit at the intersection of word lines and bit lines and are individually addressable and in which bit storage is based on a change in bulk resistance. In some examples, all or a portion of the memory 1206 may be integrated into the processor 1204. The memory 1206 may store various software and data used during operation such as one or more applications, data operated on by the application(s), libraries, and drivers.

The compute circuitry 1202 is communicatively coupled to other components of the compute node 1200 via the I/O subsystem 1208, which may be embodied as circuitry and/or components to facilitate input/output operations with the compute circuitry 1202 (e.g., with the processor 1204 or the main memory 1206) and other components of the compute circuitry 1202. For example, the I/O subsystem 1208 may be embodied as, or otherwise include, memory controller hubs, input/output control hubs, integrated sensor hubs, firmware devices, communication links (e.g., point-to-point links, bus links, wires, cables, light guides, printed circuit board traces, etc.), and/or other components and subsystems to facilitate the input/output operations. In some examples, the I/O subsystem 1208 may form a portion of a system-on-a-chip (SoC) and be incorporated, along with one or more of the processor 1204, the memory 1206, and other components of the compute circuitry 1202, into the compute circuitry 1202.

The one or more illustrative data storage devices 1210 may be embodied as any type of devices configured for short-term or long-term storage of data such as, for example, memory devices and circuits, memory cards, hard disk drives, solid-state drives, or other data storage devices. Individual data storage devices 1210 may include a system partition that stores data and firmware code for the data storage device 1210. Individual data storage devices 1210 may also include one or more operating system partitions that store data files and executables for operating systems depending on, for example, the type of compute node 1200.

The communication circuitry 1212 may be embodied as any communication circuit, device, or collection thereof, capable of enabling communications over a network between the compute circuitry 1202 and another compute device (e.g., a gateway of an implementing computing system). The communication circuitry 1212 may be configured to use any one or more communication technology (e.g., wired or wireless communications) and associated protocols (e.g., a cellular networking protocol such a 3GPP 4G or 5G standard, a wireless local area network protocol such as IEEE 802.11/Wi-Fi®, a wireless wide area network protocol, Ethernet, Bluetooth®, Bluetooth Low Energy, a IoT protocol such as IEEE 802.15.4 or ZigBee®, low-power wide-area network (LPWAN) or low-power wide-area (LPWA) protocols, etc.) to effect such communication.

The illustrative communication circuitry 1212 includes a network interface controller (NIC) 1220, which may also be referred to as a host fabric interface (HFI). The NIC 1220 may be embodied as one or more add-in-boards, daughter cards, network interface cards, controller chips, chipsets, or other devices that may be used by the compute node 1200 to connect with another compute device (e.g., a gateway node). In some examples, the NIC 1220 may be embodied as part of a system-on-a-chip (SoC) that includes one or more processors, or included on a multichip package that also contains one or more processors. In some examples, the NIC 1220 may include a local processor (not shown) and/or a local memory (not shown) that are both local to the NIC 1220. In such examples, the local processor of the NIC 1220 may be capable of performing one or more of the functions of the compute circuitry 1202 described herein. Additionally, or alternatively, in such examples, the local memory of the NIC 1220 may be integrated into one or more components of the client compute node at the board level, socket level, chip level, or other levels.

Additionally, in some examples, a respective compute node 1200 may include one or more peripheral devices 1214. Such peripheral devices 1214 may include any type of peripheral device found in a compute device or server such as audio input devices, a display, other input/output devices, interface devices, and/or other peripheral devices, depending on the particular type of the compute node 1200. In further examples, the compute node 1200 may be embodied by a respective compute node (whether a client, gateway, or aggregation node) in a computing system or like forms of appliances, computers, subsystems, circuitry, or other components.

In a more detailed example, FIG. 12B illustrates a block diagram of an example of components that may be present in a computing node 1250 for implementing the techniques (e.g., operations, processes, methods, and methodologies) described herein. This computing node 1250 provides a closer view of the respective components of node 1200 when implemented as or as part of a computing device (e.g., as a mobile device, a base station, server, gateway, etc.). The computing node 1250 may include any combinations of the hardware or logical components referenced herein, and it may include or couple with any device usable with a communication network or a combination of such networks. The components may be implemented as integrated circuits (ICs), portions thereof, discrete electronic devices, or other modules, instruction sets, programmable logic or algorithms, hardware, hardware accelerators, software, firmware, or a combination thereof adapted in the computing node 1250, or as components otherwise incorporated within a chassis of a larger system.

The computing node 1250 may include processing circuitry in the form of a processor 1252, which may be a microprocessor, a multi-core processor, a multithreaded processor, an ultra-low voltage processor, an embedded processor, an xPU/DPU/IPU/NPU, special purpose processing unit, specialized processing unit, or other known processing elements. The processor 1252 may be a part of a system on a chip (SoC) in which the processor 1252 and other components are formed into a single integrated circuit, or a single package, such as the Edison™ or Galileo™ SoC boards from Intel Corporation, Santa Clara, California. As an example, the processor 1252 may include an Intel® Architecture Core™ based CPU processor, such as a Quark™, an Atom™, an i3, an i5, an i7, an i9, or an MCU-class processor, or another such processor available from Intel®. However, any number other processors may be used, such as available from Advanced Micro Devices, Inc. (AMD®) of Sunnyvale, California, a MIPS®-based design from MIPS Technologies, Inc. of Sunnyvale, California, an ARM®-based design licensed from ARM Holdings, Ltd. or a customer thereof, or their licensees or adopters. The processors may include units such as an A5-A13 processor from Apple® Inc., a Snapdragon™ processor from Qualcomm® Technologies, Inc., or an OMAP™ processor from Texas Instruments, Inc. The processor 1252 and accompanying circuitry may be provided in a single socket form factor, multiple socket form factor, or a variety of other formats, including in limited hardware configurations or configurations that include fewer than all elements shown in FIG. 12B.

The processor 1252 may communicate with a system memory 1254 over an interconnect 1256 (e.g., a bus). Any number of memory devices may be used to provide for a given amount of system memory. As examples, the memory 1254 may be random access memory (RAM) in accordance with a Joint Electron Devices Engineering Council (JEDEC) design such as the DDR or mobile DDR standards (e.g., LPDDR, LPDDR2, LPDDR3, or LPDDR4). In particular examples, a memory component may comply with a DRAM standard promulgated by JEDEC, such as JESD79F for DDR SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4. Such standards (and similar standards) may be referred to as DDR-based standards and communication interfaces of the storage devices that implement such standards may be referred to as DDR-based interfaces. In various implementations, the individual memory devices may be of any number of different package types such as single die package (SDP), dual die package (DDP) or quad die package (Q17P). These devices, in some examples, may be directly soldered onto a motherboard to provide a lower profile solution, while in other examples the devices are configured as one or more memory modules that in turn couple to the motherboard by a given connector. Any number of other memory implementations may be used, such as other types of memory modules, e.g., dual inline memory modules (DIMMs) of different varieties including but not limited to microDIMMs or MiniDIMMs.

To provide for persistent storage of information such as data, applications, operating systems and so forth, a storage 1258 may also couple to the processor 1252 via the interconnect 1256. In an example, the storage 1258 may be implemented via a solid-state disk drive (SSDD). Other devices that may be used for the storage 1258 include flash memory cards, such as Secure Digital (SD) cards, microSD cards, extreme Digital (XD) picture cards, and the like, and Universal Serial Bus (USB) flash drives. In an example, the memory device may be or may include memory devices that use chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory.

In low power implementations, the storage 1258 may be on-die memory or registers associated with the processor 1252. However, in some examples, the storage 1258 may be implemented using a micro hard disk drive (HDD). Further, any number of new technologies may be used for the storage 1258 in addition to, or instead of, the technologies described, such resistance change memories, phase change memories, holographic memories, or chemical memories, among others.

The components may communicate over the interconnect 1256. The interconnect 1256 may include any number of technologies, including industry standard architecture (ISA), extended ISA (EISA), peripheral component interconnect (PCI), peripheral component interconnect extended (PCIx), PCI express (PCIe), or any number of other technologies. The interconnect 1256 may be a proprietary bus, for example, used in an SoC based system. Other bus systems may be included, such as an Inter-Integrated Circuit (I2C) interface, a Serial Peripheral Interface (SPI) interface, point to point interfaces, and a power bus, among others.

The interconnect 1256 may couple the processor 1252 to a transceiver 1266, for communications with the connected devices 1262. The transceiver 1266 may use any number of frequencies and protocols, such as 2.4 Gigahertz (GHz) transmissions under the IEEE 802.15.4 standard, using the Bluetooth® low energy (BLE) standard, as defined by the Bluetooth® Special Interest Group, or the ZigBee® standard, among others. Any number of radios, configured for a particular wireless communication protocol, may be used for the connections to the connected devices 1262. For example, a wireless local area network (WLAN) unit may be used to implement Wi-Fi® communications in accordance with the Institute of Electrical and Electronics Engineers (IEEE) 802.11 standard. In addition, wireless wide area communications, e.g., according to a cellular or other wireless wide area protocol, may occur via a wireless wide area network (WWAN) unit.

The wireless network transceiver 1266 (or multiple transceivers) may communicate using multiple standards or radios for communications at a different range. For example, the computing node 1250 may communicate with close devices, e.g., within about 12 meters, using a local transceiver based on Bluetooth Low Energy (BLE), or another low power radio, to save power. More distant connected devices 1262, e.g., within about 50 meters, may be reached over ZigBee® or other intermediate power radios. Both communications techniques may take place over a single radio at different power levels or may take place over separate transceivers, for example, a local transceiver using BLE and a separate mesh transceiver using ZigBee®.

A wireless network transceiver 1266 (e.g., a radio transceiver) may be included to communicate with devices or services in the cloud 1295 via local or wide area network protocols. The wireless network transceiver 1266 may be a low-power wide-area (LPWA) transceiver that follows the IEEE 802.15.4, or IEEE 802.15.4g standards, among others. The computing node 1250 may communicate over a wide area using LoRaWAN™ (Long Range Wide Area Network) developed by Semtech and the LoRa Alliance. The techniques described herein are not limited to these technologies but may be used with any number of other cloud transceivers that implement long range, low bandwidth communications, such as Sigfox, and other technologies. Further, other communications techniques, such as time-slotted channel hopping, described in the IEEE 802.15.4e specification may be used.

Any number of other radio communications and protocols may be used in addition to the systems mentioned for the wireless network transceiver 1266, as described herein. For example, the transceiver 1266 may include a cellular transceiver that uses spread spectrum (SPA/SAS) communications for implementing high-speed communications. Further, any number of other protocols may be used, such as Wi-Fi® networks for medium speed communications and provision of network communications. The transceiver 1266 may include radios that are compatible with any number of 3GPP (Third Generation Partnership Project) specifications, such as Long Term Evolution (LTE) and 5th Generation (5G) communication systems, discussed in further detail at the end of the present disclosure. A network interface controller (NIC) 1268 may be included to provide a wired communication to nodes of the cloud 1295 or to other devices, such as the connected devices 1262 (e.g., operating in a mesh). The wired communication may provide an Ethernet connection or may be based on other types of networks, such as Controller Area Network (CAN), Local Interconnect Network (LIN), DeviceNet, ControlNet, Data Highway+, PROFIBUS, or PROFINET, among many others. An additional NIC 1268 may be included to enable connecting to a second network, for example, a first NIC 1268 providing communications to the cloud over Ethernet, and a second NIC 1268 providing communications to other devices over another type of network.

Given the variety of types of applicable communications from the device to another component or network, applicable communications circuitry used by the device may include or be embodied by any one or more of components (circuitry 1264, transceiver 1266, NIC 1268, or interface 1270). Accordingly, in various examples, applicable means for communicating (e.g., receiving, transmitting, etc.) may be embodied by such communications circuitry.

The computing node 1250 may include or be coupled to acceleration circuitry 1264, which may be embodied by one or more artificial intelligence (AI) accelerators, a neural compute stick, neuromorphic hardware, an FPGA, an arrangement of GPUs, an arrangement of xPUs/DPUs/IPU/NPUs, one or more SoCs, one or more CPUs, one or more digital signal processors, dedicated ASICs, or other forms of specialized processors or circuitry designed to accomplish one or more specialized tasks. These tasks may include AI processing (including machine learning, training, inferencing, and classification operations), visual data processing, network data processing, object detection, rule analysis, or the like. These tasks also may include the specific computing tasks for service management and service operations discussed elsewhere in this document.

The interconnect 1256 may couple the processor 1252 to a sensor hub or external interface 1270 that is used to connect additional devices or subsystems. The devices may include sensors 1272, such as accelerometers, level sensors, flow sensors, optical light sensors, camera sensors, temperature sensors, global navigation system (e.g., GPS) sensors, pressure sensors, barometric pressure sensors, and the like. The hub or interface 1270 further may be used to connect the computing node 1250 to actuators 1274, such as power switches, valve actuators, an audible sound generator, a visual warning device, and the like.

In some optional examples, various input/output (I/O) devices may be present within or connected to, the computing node 1250. For example, a display or other output device 1284 may be included to show information, such as sensor readings or actuator position. An input device 1286, such as a touch screen or keypad may be included to accept input. An output device 1284 may include any number of forms of audio or visual display, including simple visual outputs such as binary status indicators (e.g., light-emitting diodes (LEDs)) and multi-character visual outputs, or more complex outputs such as display screens (e.g., liquid crystal display (LCD) screens), with the output of characters, graphics, multimedia objects, and the like being generated or produced from the operation of the computing node 1250. A display or console hardware, in the context of the present system, may be used to provide output and receive input of a computing system; to manage components or services of a computing system; identify a state of a computing component or service; or to conduct any other number of management or administration functions or service use cases.

A battery 1276 may power the computing node 1250, although, in examples in which the computing node 1250 is mounted in a fixed location, it may have a power supply coupled to an electrical grid, or the battery may be used as a backup or for temporary capabilities. The battery 1276 may be a lithium ion battery, or a metal-air battery, such as a zinc-air battery, an aluminum-air battery, a lithium-air battery, and the like.

A battery monitor/charger 1278 may be included in the computing node 1250 to track the state of charge (SoCh) of the battery 1276, if included. The battery monitor/charger 1278 may be used to monitor other parameters of the battery 1276 to provide failure predictions, such as the state of health (SoH) and the state of function (SoF) of the battery 1276. The battery monitor/charger 1278 may include a battery monitoring integrated circuit, such as an LTC4020 or an LTC2990 from Linear Technologies, an ADT7488A from ON Semiconductor of Phoenix Arizona, or an IC from the UCD90xxx family from Texas Instruments of Dallas, TX. The battery monitor/charger 1278 may communicate the information on the battery 1276 to the processor 1252 over the interconnect 1256. The battery monitor/charger 1278 may also include an analog-to-digital (ADC) converter that enables the processor 1252 to directly monitor the voltage of the battery 1276 or the current flow from the battery 1276. The battery parameters may be used to determine actions that the computing node 1250 may perform, such as transmission frequency, mesh network operation, sensing frequency, and the like.

A power block 1280, or other power supply coupled to a grid, may be coupled with the battery monitor/charger 1278 to charge the battery 1276. In some examples, the power block 1280 may be replaced with a wireless power receiver to obtain the power wirelessly, for example, through a loop antenna in the computing node 1250. A wireless battery charging circuit, such as an LTC4020 chip from Linear Technologies of Milpitas, California, among others, may be included in the battery monitor/charger 1278. The specific charging circuits may be selected based on the size of the battery 1276, and thus, the current required. The charging may be performed using the Airfuel standard promulgated by the Airfuel Alliance, the Qi wireless charging standard promulgated by the Wireless Power Consortium, or the Rezence charging standard, promulgated by the Alliance for Wireless Power, among others.

The storage 1258 may include instructions 1282 in the form of software, firmware, or hardware commands to implement the techniques described herein. Although such instructions 1282 are shown as code blocks included in the memory 1254 and the storage 1258, it may be understood that any of the code blocks may be replaced with hardwired circuits, for example, built into an application specific integrated circuit (ASIC).

In an example, the instructions 1282 provided via the memory 1254, the storage 1258, or the processor 1252 may be embodied as a non-transitory, machine-readable medium 1260 including code to direct the processor 1252 to perform electronic operations in the computing node 1250. The processor 1252 may access the non-transitory, machine-readable medium 1260 over the interconnect 1256. For instance, the non-transitory, machine-readable medium 1260 may be embodied by devices described for the storage 1258 or may include specific storage units such as optical disks, flash drives, or any number of other hardware devices. The non-transitory, machine-readable medium 1260 may include instructions to direct the processor 1252 to perform a specific sequence or flow of actions, for example, as described with respect to the flowchart(s) and block diagram(s) of operations and functionality depicted above. As used herein, the terms "machine-readable medium" and "computer-readable medium" are interchangeable.

Also in a specific example, the instructions 1282 on the processor 1252 (separately, or in combination with the instructions 1282 of the machine readable medium 1260) may configure execution or operation of a trusted execution environment (TEE) 1290. In an example, the TEE 1290 operates as a protected area accessible to the processor 1252 for secure execution of instructions and secure access to data. Various implementations of the TEE 1290, and an accompanying secure area in the processor 1252 or the memory 1254 may be provided, for instance, through use of Intel® Software Guard Extensions (SGX) or ARM® TrustZone® hardware security extensions, Intel® Management Engine (ME), or Intel® Converged Security Manageability Engine (CSME). Other aspects of security hardening, hardware roots-of-trust, and trusted or protected operations may be implemented in the computing node 1250 through the TEE 1290 and the processor 1252.

In further examples, a machine-readable medium also includes any tangible medium that is capable of storing, encoding or carrying instructions for execution by a machine and that cause the machine to perform any one or more of the methodologies of the present disclosure or that is capable of storing, encoding or carrying data structures utilized by or associated with such instructions. A "machine-readable medium" thus may include but is not limited to, solid-state memories, and optical and magnetic media. Specific examples of machine-readable media include non-volatile memory, including but not limited to, by way of example, semiconductor memory devices (e.g., electrically programmable read-only memory (EPROM), electrically erasable programmable read-only memory (EEPROM)) and flash memory devices; magnetic disks such as internal hard disks and removable disks; magneto-optical disks; and CD-ROM and DVD-ROM disks. The instructions embodied by a machine-readable medium may further be transmitted or received over a communications network using a transmission medium via a network interface device utilizing any one of a number of transfer protocols (e.g., Hypertext Transfer Protocol (HTTP)).

A machine-readable medium may be provided by a storage device or other apparatus which is capable of hosting data in a non-transitory format. In an example, information stored or otherwise provided on a machine-readable medium may be representative of instructions, such as instructions themselves or a format from which the instructions may be derived. This format from which the instructions may be derived may include source code, encoded instructions (e.g., in compressed or encrypted form), packaged instructions (e.g., split into multiple packages), or the like. The information representative of the instructions in the machine-readable medium may be processed by processing circuitry into the instructions to implement any of the operations discussed herein. For example, deriving the instructions from the information (e.g., processing by the processing circuitry) may include: compiling (e.g., from source code, object code, etc.), interpreting, loading, organizing (e.g., dynamically or statically linking), encoding, decoding, encrypting, unencrypting, packaging, unpackaging, or otherwise manipulating the information into the instructions.

In an example, the derivation of the instructions may include assembly, compilation, or interpretation of the information (e.g., by the processing circuitry) to create the instructions from some intermediate or preprocessed format provided by the machine-readable medium. The information, when provided in multiple parts, may be combined, unpacked, and modified to create the instructions. For example, the information may be in multiple compressed source code packages (or object code, or binary executable code, etc.) on one or several remote servers. The source code packages may be encrypted when in transit over a network and decrypted, uncompressed, assembled (e.g., linked) if necessary, and compiled or interpreted (e.g., into a library, stand-alone executable, etc.) at a local machine, and executed by the local machine.

It should be understood that the functional units or capabilities described in this specification may have been referred to or labeled as components or modules, in order to more particularly emphasize their implementation independence. Such components may be embodied by any number of software or hardware forms. For example, a component or module may be implemented as a hardware circuit comprising custom very-large-scale integration (VLSI) circuits or gate arrays, off-the-shelf semiconductors such as logic chips, transistors, or other discrete components. A component or module may also be implemented in programmable hardware devices such as field programmable gate arrays, programmable array logic, programmable logic devices, or the like. Components or modules may also be implemented in software for execution by various types of processors. An identified component or module of executable code may, for instance, comprise one or more physical or logical blocks of computer instructions, which may, for instance, be organized as an object, procedure, or function. Nevertheless, the executables of an identified component or module need not be physically located together but may comprise disparate instructions stored in different locations which, when joined logically together (e.g., including over a wire, over a network, using one or more platforms, wirelessly, via a software component, or the like), comprise the component or module and achieve the stated purpose for the component or module.

Indeed, a component or module of executable code may be a single instruction, or many instructions, and may even be distributed over several different code segments, among different programs, and across several memory devices or processing systems. In particular, some aspects of the described process (such as code rewriting and code analysis) may take place on a different processing system (e.g., in a computer in a data center) than that in which the code is deployed (e.g., in a computer embedded in a sensor or robot). Similarly, operational data may be identified and illustrated herein within components or modules and may be embodied in any suitable form and organized within any suitable type of data structure. The operational data may be collected as a single data set or may be distributed over different locations including over different storage devices, and may exist, at least partially, merely as electronic signals on a system or network. The components or modules may be passive or active, including agents operable to perform desired functions.

Additional examples of the presently described method, system, and device embodiments include the following, non-limiting implementations. Each of the following non-limiting examples may stand on its own or may be combined in any permutation or combination with any one or more of the other examples provided below or throughout the present disclosure. Each of these non-limiting examples may stand on its own, or may be combined in various permutations or combinations with one or more of the other examples.

Example 1 is at least one machine-readable medium, including instructions, which when executed by processing circuitry, cause the processing circuitry to perform operations to: track an object to be transferred from an object source to a robot, the object source comprising a human source or a robot source that holds the object using one or more arms; identify, from at least one image captured by the robot, a posture of the object source; identify respective segments of the object source from the posture of the object source; determine an estimated weight of the object based on a center of gravity of the object source, the center of gravity of the object source calculated from a balance of the respective segments; and cause a responsive action with the robot, based on the estimated weight of the object.

In Example 2, the subject matter of Example 1 optionally includes subject matter where the responsive action with the robot includes a command to change a posture of the robot to handle the estimated weight of the object using one or more arms or legs of the robot.

In Example 3, the subject matter of any one or more of Examples 1-2 optionally include subject matter where the responsive action with the robot includes a command to reject a transfer of the object, based on the estimated weight of the object exceeding a maximum weight.

In Example 4, the subject matter of any one or more of Examples 1-3 optionally include subject matter where to determine the estimated weight of the object is further based on an angle of lean of the object source when holding the object, wherein the angle of lean occurs in opposition to the estimated weight of the object source.

In Example 5, the subject matter of any one or more of Examples 1-4 optionally include subject matter where to determine the estimated weight of the object is further based on a center of mass of the object source when holding the object.

In Example 6, the subject matter of any one or more of Examples 1-5 optionally include subject matter where the center of gravity for the object source is based on positions of centers of gravity of the respective segments of the object source.

In Example 7, the subject matter of Example 6 optionally includes subject matter where the center of gravity for the object source is calculated from estimated weights determined in the respective segments, the estimated weights determined based on orientation of the respective segments and points of balance of the respective segments.

In Example 8, the subject matter of any one or more of Examples 1-7 optionally include subject matter where to determine the estimated weight of the object is further based on visual analysis of the object.

In Example 9, the subject matter of Example 8 optionally includes subject matter where the visual analysis of the object is produced from a trained model, and wherein the trained model is refined using feedback from weight estimations and weight sensing.

Example 10 is a system comprising: visual processing circuitry configured to: track an object to be transferred from an object source to a robot based on at least one image captured by the robot, wherein the object source comprises a human source or a robot source that holds the object using one or more arms; and identify a posture of the object source and identify respective segments of the object source based on the at least one image; processing circuitry configured to: generate an estimated weight of the object, based on a center of gravity of the object source calculated from a balance of the respective segments; and cause a responsive action with the robot, based on the estimated weight of the object.

In Example 11, the subject matter of Example 10 optionally includes subject matter where the responsive action with the robot includes a command to change a posture of the robot to handle the estimated weight of the object using one or more arms or legs of the robot.

In Example 12, the subject matter of any one or more of Examples 10-11 optionally include subject matter where the responsive action with the robot includes a command to reject a transfer of the object, based on the estimated weight of the object exceeding a maximum weight.

In Example 13, the subject matter of any one or more of Examples 10-12 optionally include subject matter where to calculate the estimated weight of the object is further based on an angle of lean of the object source when holding the object, wherein the angle of lean occurs in opposition to the estimated weight of the object source.

In Example 14, the subject matter of any one or more of Examples 10-13 optionally include subject matter where to calculate the estimated weight of the object is further based on a center of mass of the object source when holding the object.

In Example 15, the subject matter of any one or more of Examples 10-14 optionally include subject matter where the center of gravity for the object source is based on positions of centers of gravity of the respective segments of the object source.

In Example 16, the subject matter of Example 15 optionally includes subject matter where the center of gravity for the object source is calculated from estimated weights determined in the respective segments, the estimated weights determined based on orientation of the respective segments and points of balance of the respective segments.

In Example 17, the subject matter of any one or more of Examples 12-16 optionally include subject matter where the processing circuitry is further configured to determine the estimated weight of the object based on visual analysis of the object.

In Example 18, the subject matter of Example 17 optionally includes subject matter where the visual analysis of the object is produced from a trained model executed by the processing circuitry, and wherein the trained model is refined using feedback from weight estimations and weight sensing.

Example 19 is an apparatus comprising: sensing means for capturing image data of an object to be transferred from an object source to a robot, wherein the object source comprises a human source or a robot source that holds the object using one or more arms; visual processing means for identifying (i) a posture of the object source and (ii) respective segments of the object source, based on the image data; processing means for calculating an estimated weight of the object, based on a center of gravity of the object source calculated from a balance of the respective segments; and control means for causing a responsive action with the robot, based on the estimated weight of the object.

In Example 20, the subject matter of Example 19 optionally includes subject matter where the robot is an ambulatory robot, and wherein the responsive action with the robot includes: implementing a command to change a posture of the robot to handle the estimated weight of the object using one or more arms or legs of the robot; or implementing a command to reject a transfer of the object, based on the estimated weight of the object exceeding a maximum weight.

Example 21 is a method to manufacture, use, control, implement, or perform operations for any of Examples 1-20.

Example 22 is an apparatus comprising means to implement of any of Examples 1-20.

Example 23 is a system to implement of any of Examples 1-20.

Example 24 is a method to implement of any of Examples 1-20.

Although these implementations have been described with reference to specific exemplary aspects, it will be evident that various modifications and changes may be made to these aspects without departing from the broader scope of the present disclosure. Many of the arrangements and processes described herein can be used in combination or in parallel implementations to provide greater bandwidth/ throughput and to support compute services selections that can be made available to the compute systems being serviced. Accordingly, the specification and drawings are to be regarded in an illustrative rather than a restrictive sense. The accompanying drawings that form a part hereof show, by way of illustration, and not of limitation, specific aspects in which the subject matter may be practiced. The aspects illustrated are described in sufficient detail to enable those skilled in the art to practice the teachings disclosed herein. Other aspects may be utilized and derived therefrom, such that structural and logical substitutions and changes may be made without departing from the scope of this disclosure. This Detailed Description, therefore, is not to be taken in a limiting sense, and the scope of various aspects is defined only by the appended claims, along with the full range of equivalents to which such claims are entitled.

Such aspects of the inventive subject matter may be referred to herein, individually and/or collectively, merely for convenience and without intending to voluntarily limit the scope of this application to any single aspect or inventive concept if more than one is in fact disclosed. Thus, although specific aspects have been illustrated and described herein, it should be appreciated that any arrangement calculated to achieve the same purpose may be substituted for the specific aspects shown. This disclosure is intended to cover any and all adaptations or variations of various aspects. Combinations of the above aspects and other aspects not specifically described herein will be apparent to those of skill in the art upon reviewing the above description.

Method examples described herein may be machine or computer-implemented at least in part. Some examples may include a computer-readable medium or machine-readable medium encoded with instructions operable to configure an electronic device to perform methods as described in the above examples. An implementation of such methods may include code, such as microcode, assembly language code, a higher-level language code, or the like. Such code may include computer readable instructions for performing various methods. The code may form portions of computer program products. Further, in an example, the code may be tangibly stored on one or more volatile, non-transitory, or non-volatile tangible computer-readable media, such as during execution or at other times. Examples of these tangible computer-readable media may include, but are not limited to, hard disks, removable magnetic disks, removable optical disks (e.g., compact disks and digital video disks), magnetic cassettes, memory cards or sticks, random access memories (RAMs), read only memories (ROMs), and the like.

What is claimed is:

1. At least one non-transitory machine-readable medium, including instructions, which when executed by processing circuitry, cause the processing circuitry to perform operations to: track an object to be transferred from an object source to a robot, the object source comprising a human source or a robot source that holds the object using one or more arms; identify, from at least one image captured by the robot, a posture of the object source; identify respective segments of the object source from the posture of the object source; determine an estimated weight of the object based on a center of gravity of the object source, the center of gravity of the object source calculated from a balance of the respective segments; and cause a responsive action with the robot, based on the estimated weight of the object.

2. The at least one non-transitory machine-readable medium of claim 1, wherein the responsive action with the robot includes a command to change a posture of the robot to handle the estimated weight of the object using one or more arms or legs of the robot.

3. The at least one non-transitory machine-readable medium of claim 1, wherein the responsive action with the robot includes a command to reject a transfer of the object, based on the estimated weight of the object exceeding a maximum weight.

4. The at least one non-transitory machine-readable medium of claim 1, wherein to determine the estimated weight of the object is further based on an angle of lean of the object source when holding the object, wherein the angle of lean occurs in opposition to the estimated weight of the object source.

5. The at least one non-transitory machine-readable medium of claim 1, wherein to determine the estimated weight of the object is further based on a center of mass of the object source when holding the object.

6. The at least one non-transitory machine-readable medium of claim 1, wherein the center of gravity for the object source is based on positions of centers of gravity of the respective segments of the object source.

7. The at least one non-transitory machine-readable medium of claim 6, wherein the center of gravity for the object source is calculated from estimated weights determined in the respective segments, the estimated weights determined based on orientation of the respective segments and points of balance of the respective segments.

8. The at least one non-transitory machine-readable medium of claim 1, wherein to determine the estimated weight of the object is further based on visual analysis of the object.

9. The at least one non-transitory machine-readable medium of claim 8, wherein the visual analysis of the object is produced from a trained model, and wherein the trained model is refined using feedback from weight estimations and weight sensing.

10. A system comprising:

visual processing circuitry configured to:

track an object to be transferred from an object source to a robot based on at least one image captured by the robot, wherein the object source comprises a human source or a robot source that holds the object using one or more arms; and identify a posture of the object source and identify respective segments of the object source based on the at least one image;

processing circuitry configured to:

generate an estimated weight of the object, based on a center of gravity of the object source calculated from a balance of the respective segments; and cause a responsive action with the robot, based on the estimated weight of the object.

11. The system of claim 10, wherein the responsive action with the robot includes a command to change a posture of the robot to handle the estimated weight of the object using one or more arms or legs of the robot.

12. The system of claim 10, wherein the responsive action with the robot includes a command to reject a transfer of the object, based on the estimated weight of the object exceeding a maximum weight.

13. The system of claim 12, wherein the processing circuitry is further configured to determine the estimated weight of the object based on visual analysis of the object.

14. The system of claim 13, wherein the visual analysis of the object is produced from a trained model executed by the processing circuitry, and wherein the trained model is refined using feedback from weight estimations and weight sensing.

15. The system of claim 10, wherein to calculate the estimated weight of the object is further based on an angle of lean of the object source when holding the object, wherein the angle of lean occurs in opposition to the estimated weight of the object source.

16. The system of claim 10, wherein to calculate the estimated weight of the object is further based on a center of mass of the object source when holding the object.

17. The system of claim 10, wherein the center of gravity for the object source is based on positions of centers of gravity of the respective segments of the object source.

18. The system of claim 17, wherein the center of gravity for the object source is calculated from estimated weights determined in the respective segments, the estimated weights determined based on orientation of the respective segments and points of balance of the respective segments.

19. An apparatus comprising:

sensing means for capturing image data of an object to be transferred from an object source to a robot, wherein the object source comprises a human source or a robot source that holds the object using one or more arms;

visual processing means for identifying (i) a posture of the object source and (ii) respective segments of the object source, based on the image data;

processing means for calculating an estimated weight of the object, based on a center of gravity of the object source calculated from a balance of the respective segments; and control means for causing a responsive action with the robot, based on the estimated weight of the object.

20. The apparatus of claim 19, wherein the robot is an ambulatory robot, and wherein the responsive action with the robot includes:

implementing a command to change a posture of the robot to handle the estimated weight of the object using one or more arms or legs of the robot; or implementing a command to reject a transfer of the object, based on the estimated weight of the object exceeding a maximum weight.

* * * * *